(12) United States Patent
Hirata et al.

(10) Patent No.: US 11,828,938 B2
(45) Date of Patent: Nov. 28, 2023

(54) INFORMATION DISPLAY APPARATUS

(71) Applicants: MAXELL, LTD., Kyoto (JP); Hitachi Industry & Control Solutions, Ltd., Ibaraki (JP)

(72) Inventors: Koji Hirata, Kyoto (JP); Masahiko Yatsu, Kyoto (JP); Toshinori Sugiyama, Kyoto (JP); Kazuomi Kaneko, Ibaraki (JP); Shigeki Hoshino, Kyoto (JP)

(73) Assignees: MAXELL, LTD., Kyoto (JP); Hitachi Industry & Control Solutions, Ltd., Ibaraki (JP)

( * ) Notice: Subject to any disclaimer, the term of this patent is extended or adjusted under 35 U.S.C. 154(b) by 78 days.

(21) Appl. No.: 17/538,520

(22) Filed: Nov. 30, 2021

(65) Prior Publication Data
US 2022/0082826 A1 Mar. 17, 2022

Related U.S. Application Data

(63) Continuation of application No. 16/094,173, filed as application No. PCT/JP2016/063068 on Apr. 26, 2016, now Pat. No. 11,221,480.

(51) Int. Cl.
  *G02B 27/14* (2006.01)
  *G02B 27/01* (2006.01)
  (Continued)

(52) U.S. Cl.
  CPC .......... *G02B 27/0101* (2013.01); *B60K 35/00* (2013.01); *G02B 17/0605* (2013.01);
  (Continued)

(58) Field of Classification Search
  CPC .. B60K 35/00; B60K 37/04; B60K 2370/334; B60K 2370/1529; B60K 2370/166;
  (Continued)

(56) References Cited

U.S. PATENT DOCUMENTS

| 5,504,622 A | 4/1996 | Oikawa et al. |
| 5,760,931 A | 6/1998 | Saburi et al. |

(Continued)

FOREIGN PATENT DOCUMENTS

| JP | 06-270716 A | 9/1994 |
| JP | H10-221684 A | 8/1998 |

(Continued)

OTHER PUBLICATIONS

International Search Report issued in corresponding International Patent Application No. PCT/JP2016/063068, dated Jul. 12, 2016, with English Translation.

(Continued)

*Primary Examiner* — Mahidere S Sahle
(74) *Attorney, Agent, or Firm* — McDermott Will & Emery LLP

(57) ABSTRACT

A small information display apparatus capable of displaying video information on a windshield as a virtual image is provided. An information display apparatus configured to display video information of a virtual image on a windshield of a conveyance includes: a liquid crystal panel arranged as a video display apparatus configured to form the video information; and a virtual image optical system provided with a windshield for displaying the virtual image at a front of the conveyance by reflecting video of the liquid crystal panel by means of the windshield. The virtual image optical system is configured by arranging a concave mirror and an optical element between the concave mirror and the video display apparatus.

13 Claims, 14 Drawing Sheets

(51) Int. Cl.
   *B60K 35/00* (2006.01)
   *G02B 17/06* (2006.01)
   *G01C 21/36* (2006.01)

(52) U.S. Cl.
   CPC ........ *G02B 27/01* (2013.01); *B60K 2370/334* (2019.05); *G01C 21/365* (2013.01); *G02B 2027/011* (2013.01); *G02B 2027/0116* (2013.01); *G02B 2027/0118* (2013.01)

(58) Field of Classification Search
   CPC .......... B60K 2370/177; G02B 17/0605; G02B 27/0101; G02B 27/01; G02B 27/0179; G02B 2027/011; G02B 2027/0116; G02B 2027/0118; G01C 21/365
   USPC .......... 345/7; 359/13, 14, 25, 630, 631, 633, 359/637, 858
   See application file for complete search history.

(56) References Cited

U.S. PATENT DOCUMENTS

| | | |
|---|---|---|
| 9,429,764 B2 | 8/2016 | Harrold et al. |
| 9,541,766 B2 | 1/2017 | Harrold et al. |
| 10,712,582 B2 | 7/2020 | Harrold et al. |
| 2016/0195719 A1 | 7/2016 | Yonetani |
| 2016/0266283 A1 | 9/2016 | Segawa |
| 2017/0150134 A1 | 5/2017 | Harrold et al. |
| 2017/0307883 A1 | 10/2017 | Yamasaki |
| 2018/0017792 A1 | 1/2018 | Takazawa et al. |
| 2019/0033586 A1 | 1/2019 | Miyato et al. |

FOREIGN PATENT DOCUMENTS

| | | |
|---|---|---|
| JP | 2005-206133 A | 8/2005 |
| JP | 2009-122582 A | 6/2009 |
| JP | 2013-024921 A | 2/2013 |
| JP | 2013-174855 A | 9/2013 |
| JP | 2014-164066 A | 9/2014 |
| JP | 2015-146012 A | 8/2015 |
| JP | 2015-525498 A | 9/2015 |
| JP | 2015-194707 A | 11/2015 |
| JP | 2016-053691 A | 4/2016 |
| JP | 2016-133773 A | 7/2016 |
| JP | 2017-129683 A | 7/2017 |

OTHER PUBLICATIONS

Y. Tanahashi et al., "Development of Full-Color Head-up Display Using Laser Projector", Pioneer R&D, vol. 22, 2013, with English Translation.

Japanese Notice of Reasons for Refusal issued in corresponding Japanese Patent Application No. 2019-219338, dated Nov. 10, 2020, with English translation.

Non-Final Rejection received in corresponding U.S. Appl. No. 16/094,173, dated Oct. 15, 2020.

Final Rejection received in corresponding U.S. Appl. No. 16/094,173, dated May 13, 2021.

Japanese Notice of Reasons for Refusal issued in corresponding Japanese Patent Application No. 2022-203923, dated Jul. 25, 2023, with English translation.

INFORMATION DISPLAY APPARATUS

CROSS-REFERENCE

This application is a continuation under 35 U.S.C. § 111(a) of U.S. patent application Ser. No. 16/094,173, filed on Oct. 16, 2018, which in turn is the U.S. National Phase under 35 U.S.C. § 371 of International Patent Application No. PCT/JP2016/063068, filed on Apr. 26, 2016, the entire disclosures of which applications are incorporated by reference herein.

TECHNICAL FIELD

The present invention relates to an information display apparatus that projects that projects an image on a windshield of a vehicle, an electric train, an airplane or the like (hereinafter, generally referred to as "conveyance"). The present invention also relates to a projection optical system in which an image is observed through the windshield as a virtual image and an information display apparatus using the same.

A so-called head-up display (HUD: Head-Up-Display) apparatus has already been known by Patent Document 1 below. The head-up display apparatus project video light onto a windshield of a vehicle to form a virtual image, thereby displaying traffic information such as route information or traffic jam information and vehicle information such as a remaining amount of fuel or cooling water temperature thereon.

It is desirable that this type of information display apparatus is to be miniaturized because a main body of the HUD apparatus is arranged between a steering and a window glass in front of a driver's seat.

On the other hand, for example, an apparatus whose body is attached to the vicinity of a ceiling (or a sun visor) of a vehicle as also disclosed in Non-Patent Document 1 below has been proposed.

RELATED ART DOCUMENTS

Patent Documents

Patent document 1: Japanese Unexamined Patent Application Publication No. 2015-194707

Non-Patent Documents

Non-Patent document 1: PIONEER R&D (Vol. 22, 2013)

SUMMARY OF THE INVENTION

Problems to be Solved by the Invention

As shown in FIG. 27, a principle of generation of a virtual image by a concave mirror to realize a head-up display apparatus according to a conventional technique arranges an object point AB at an inner side of a focal point F (focal point distance f) with respect to a point O on an optical axis of a concave mirror 1', thereby allowing the virtual image by the concave mirror 1' to be obtained. In FIG. 27, for convenience of explanation, the concave mirror 1' is regarded as a convex lens with the same positive refractive power, and a relationship among an object point, the convex lens (described by the concave mirror in FIG. 27 for convenience of explanation), and the virtual image to be generated is shown.

In the conventional technique, the object point AB should be caused to approach the focal point F in order to enlarge a size of the virtual image to be generated on the concave mirror 1'. However, in order to obtain desired magnification, a radius of curvature of the concave mirror becomes smaller. As a result, a mirror size becomes smaller, and this results in a state where only a virtual image whose effectively viewable range, in which magnification power is large, is small can be obtained. For this reason, in order to satisfy (1) a desired size of a virtual image, and (2) necessary magnification of the virtual image M=b/a at the same time, it is necessary that a dimension of the concave mirror is fitted to a viewing range and magnification of the virtual image is determined in view of a video display apparatus.

For this reason, in the conventional technique, in order to obtain a virtual image with a desired size, as shown in FIG. 27, it is necessary that a distance from the concave mirror 1' to the virtual image becomes larger, and as a result, a dimension of the information display apparatus must become larger.

Moreover, as described above, with respect to a size of a virtual image viewed and recognized by a driver, a distance "a" between the video display apparatus and the concave mirror 1' and a distance "b" between the concave mirror 1' and the virtual image are different between an upper end and a lower end of the virtual image, which is caused by inclination of a windshield. Therefore, it was difficult that image magnification in an upper end portion of the virtual image is caused to substantially correspond with image magnification in a lower end portion of the virtual image. For this reason, it is necessary that a difference between an upper optical path and a lower optical path is made relatively smaller by causing the dimension "b" mentioned above to become larger, thereby reducing a partial change in image magnification (distortion of an image). Examination to reduce volume of the information display apparatus has been carried out by providing an optical path folding mirror between the video display apparatus and the concave mirror 1'.

Further, in the example of the head-up display apparatus disclosed in Patent Document 1 described above, the head-up display apparatus includes a device configured to display an image and a projection optical system configured to project the image displayed by the display device. The projection optical system includes a first mirror and a second mirror on an optical path of a viewer from the display device. Miniaturization is realized by satisfying predetermined conditions for a relationship among an incident angle of the first mirror in a long axis direction of the image, an incident angle of the first mirror in a short axis direction of the image, an interval between an image display surface of the display device and the first mirror, and a width of a virtual image viewed and recognized by the viewer in a horizontal direction.

However, although it will be described later, as a result of the examination by the inventors, it was found that in order to make volume of a set the smallest, this can be realized without changing a size of the virtual image and providing a folding mirror (121 in FIG. 2 of Patent Document 1) by shortening a focal point distance of a concave mirror (122 in FIG. 2 of Patent Document 1), which creates the virtual image and shortening a distance between a position of the display device and the focal point of the concave mirror.

On the other hand, in the apparatus whose body is attached to the vicinity of the ceiling (or the sun visor) of the vehicle as disclosed in Non-Patent Document 1, in a case where the vehicle causes a collision accident and the HUD apparatus is thereby disengaged, safety problems remain such as a possibility that a driver may be injured. Therefore, the inventors thought that the method described in Patent Document 1 described above would become mainstream in the future.

Moreover, in Patent Document 1 described above, in a case where a plurality of viewpoint positions of the driver exists on a reflecting surface of a windshield that is a projected member (220), the projection optical system is optimized as shown in all embodiments on the ground that a central position of a radius of curvature in a vertical direction of a vehicle body of the windshield is different from that of a radius of curvature in a horizontal direction of the vehicle body and the windshield has a toroidal shape.

Further, in first, second, third, fourth, sixth, and seventh embodiments of Patent Document 1 mentioned above, by arranging two mirrors between the driver and the display device within substantially the same plane, miniaturization of a set size is realized. In addition, in order to make a size of the second mirror having a reflecting surface with a concave surface shape, which generates the virtual image, smaller, distortion of the virtual image in the whole view point area is reduced up to a level practically having no problem by setting each reflecting surface of the first mirror having a reflecting surface with a convex shape to a free-form surface.

Further, in a fifth embodiment thereof, by causing the first mirror to have a toroidal surface with the convex shape as the reflecting surface, the mirror is manufactured easily. On the other hand, the second mirror is caused to be the concave mirror with a free-form surface shape as well as the other embodiments.

In the invention disclosed in Patent Document 1 described above, it is necessary to arrange the two mirrors between an observer and the display device. In addition, in order to arrange them so that reflected light flux by the first mirror is not blocked out by the second mirror, the degree of freedom of arrangement is lost and close arrangement cannot be made. Therefore, it may cause a problem for miniaturization of the set. On the other hand, with respect to correction of aberration that occurs in the virtual image viewed by the driver, necessity of the correction and a concrete method of reducing the same has never been described and considered in Patent Document 1.

It is an object of the present invention to provide an information display apparatus capable of forming a virtual image with high visibility, in which distortion and aberration of the virtual image viewed and recognized by a driver are reduced up to a level practically having no problem, while suppressing increase in size and complication of a set by configuring one mirror as a mirror having a reflecting surface of a concave surface on which the virtual image is formed and arranging a lens whose cross section of at least one surface is a concave surface (having negative refractive power) between the driver and a display device in order to miniaturize the apparatus.

Means for Solving the Problem

One example of the present invention that is made in order to achieve the object described above is an information display apparatus configured to display video information of a virtual image on a windshield of conveyance, the information display apparatus including: a flat panel display configured to display the video information; and a virtual image optical system configured to display a plurality of virtual images at a front of the conveyance by reflecting light emitted from the flat panel display by means of the windshield. The virtual image optical system includes a concave mirror and an optical element. The optical element establishes a virtual image to be superimposed on a distant view at an upper portion of the windshield, and optimizes a shape and a position of the optical element to be addressed to video light flux in which each of the virtual images separated between the flat panel display and the concave mirror is established so as to establish a virtual image to be superimposed on a near view from the upper portion toward a lower portion of the windshield, whereby the information display apparatus respectively forms the plurality of virtual images at a plurality of positions corresponding to a viewpoint position of a driver while reducing a size thereof.

Effects of the Invention

According to the present invention, it becomes possible to provide an information display apparatus capable of forming a virtual image with high visibility by correcting distortion and/or aberration of the virtual image observed by a driver while realizing miniaturization of the apparatus.

BRIEF DESCRIPTIONS OF THE DRAWINGS

DETAILED DESCRIPTION OF EMBODIMENTS

Figure 1:
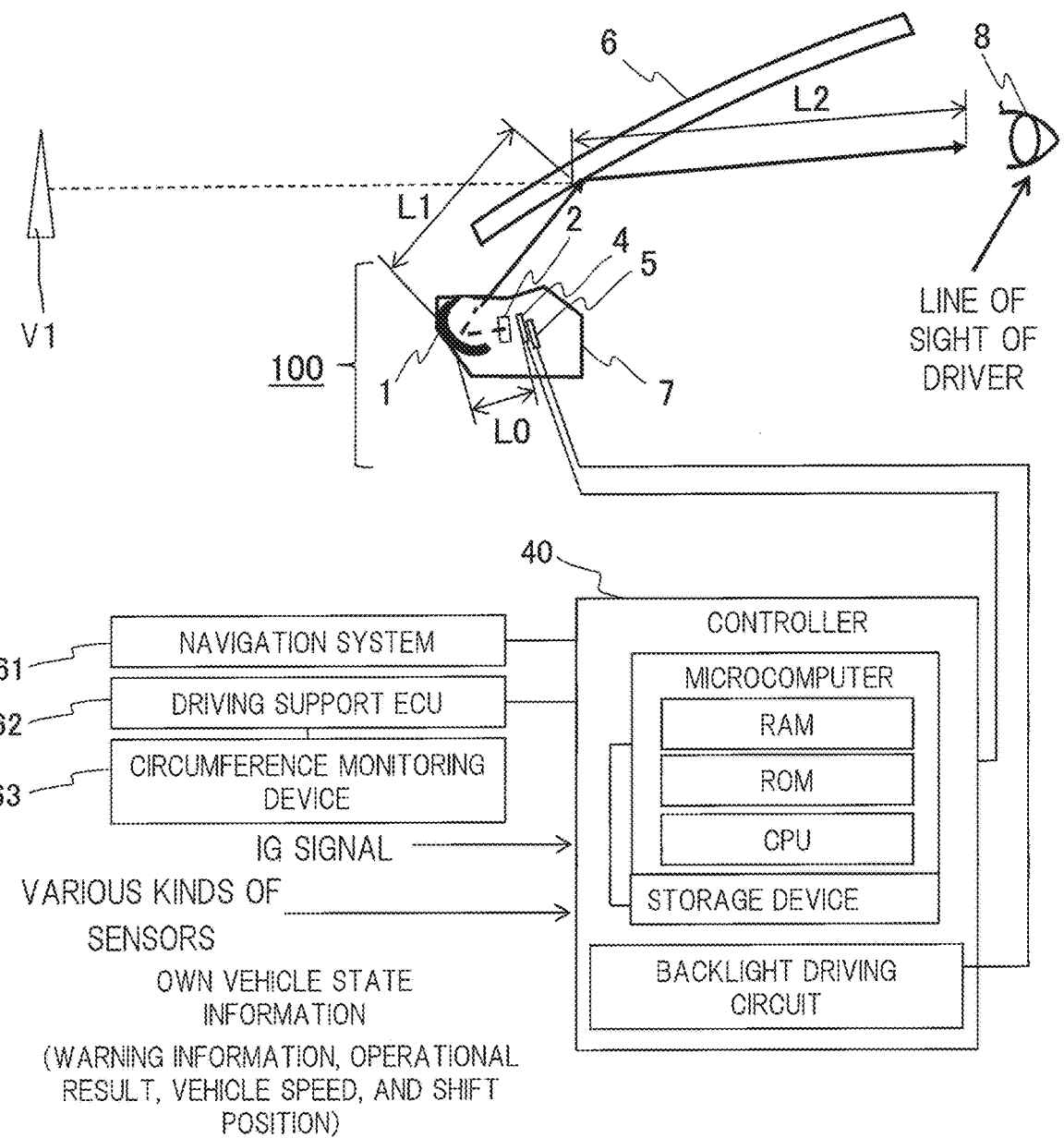
FIG. 1 is a schematic configuration diagram showing a schematic configuration of an information display apparatus and peripheral equipment that is assigned to the information display apparatus.

Hereinafter, various kinds of embodiments of the present invention will be described in detail with reference to the drawings and the like. Note that the following explanation illustrates specific examples of the content of the present invention; the present invention is not limited to this explanation; and various changes and modifications can be made by a person having ordinary skill in the art within a scope of technical ideas disclosed in the present specification. Further, in all of the drawings for explaining the present invention, the same reference numeral may be attached to a component having the same function, and repeated explanation may be omitted.

<Embodiments of Information Display Apparatus>

FIG. 1 is a block diagram and a schematic configuration diagram showing a peripheral equipment configuration of an information display apparatus according to one embodiment of the present invention. Here, an information display apparatus configured to project an image onto a windshield of a vehicle will be described particularly as one example thereof.

An information display apparatus 100 is an apparatus (that is, a so-called HUD (Headup Display)) configured to display, as a virtual image VI (Virtual Image), various kinds of information that are reflected by a projected member 6 (in the present embodiment, an inner surface of the windshield) in order to form a virtual image V1 at a front side of an own vehicle along a line of sight 8 of a driver. In this regard, the projected member 6 may be a member on which information is projected, and it may be not only the windshield described above, but also a combiner. Namely, in the information display apparatus 100 according to the present embodiment, the projected member 6 may be a member that allows the driver to view (and recognize) a virtual image that is formed at the front side of the own vehicle along the line of sight 8 the driver. As a matter of course, vehicle information, and information on the foreground photographed by cameras (not shown in the drawings), such as a monitoring camera or an around viewer, are contained as the information to be displayed as the virtual image, for example.

Further, the information display apparatus 100 includes a video display apparatus 4, a concave mirror 1, and a group of lenses 2 for correction provided between the video display apparatus 4 and the concave mirror 1. The video display apparatus 4 is configured to project video light to display information. The group of lenses 2 is configured to correct distortion and/or aberration that occurs when a virtual image is formed by a concave mirror 1 from video displayed by the video display apparatus 4.

The information display apparatus 100 also includes a controller 40 configured to control the video display apparatus 4 described above and a backlight 5. Note that optical components including the video display apparatus 4 and the backlight 5 described above is a virtual image optical system, which will be described later, and includes the mirror 1 with a concave surface shape, which reflects light. Further, the light reflected by these optical components is reflected by the projected member 6 to go toward the line of sight 8 of the driver (EyeBox: which will be described later).

As the video display apparatus 4 described above, for example, there are a light emitting VFD (Vacuum Fluorescent Display) and the like in addition to an LCD (Liquid Crystal Display) having a backlight.

On the other hand, in place of the video display apparatus 4 described above, video may be displayed on a screen by a projection apparatus, a virtual image may be formed therefrom by the concave mirror 1 described above and reflected by a windshield 6 that is the projected member to direct to the line of sight 8 of the driver.

As such a screen, for example, the screen may be configured by a microlens array in which microlenses are arranged thereon in a two-dimensional manner.

More specifically, in order to reduce distortion of the virtual image, a shape of the concave mirror 1 may have a shape in which a radius of curvature at an upper portion shown in FIG. 1 (that is, an area where a ray is reflected at a lower part of the windshield 6 at which a distance from a viewpoint of the driver is relatively short) so that magnification power thereof becomes larger is relatively small, and a radius of curvature at a lower portion thereof (that is, an area where a ray is reflected at an upper part of the windshield 6 at which a distance from the viewpoint of the driver is relatively long) so that magnification power thereof becomes smaller is relatively large. Further, a difference of virtual image magnifications described above is corrected by inclining the video display apparatus 4 with respect to an optical axis of the concave mirror to reduce distortion itself that may occur, whereby good correction can further be realized.

Figure 2:
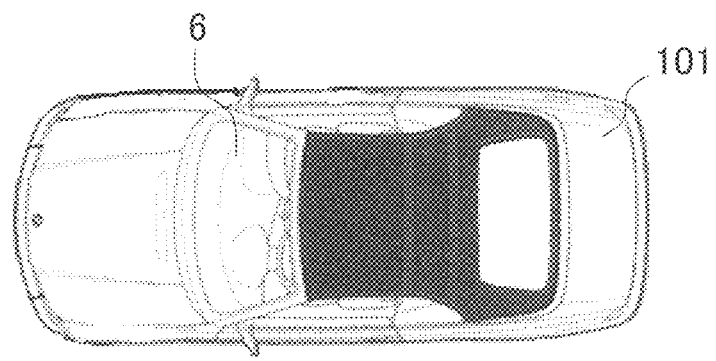
FIG. 2 is a top view of a vehicle on which the information display apparatus according to the present invention is mounted.
Figure 3:
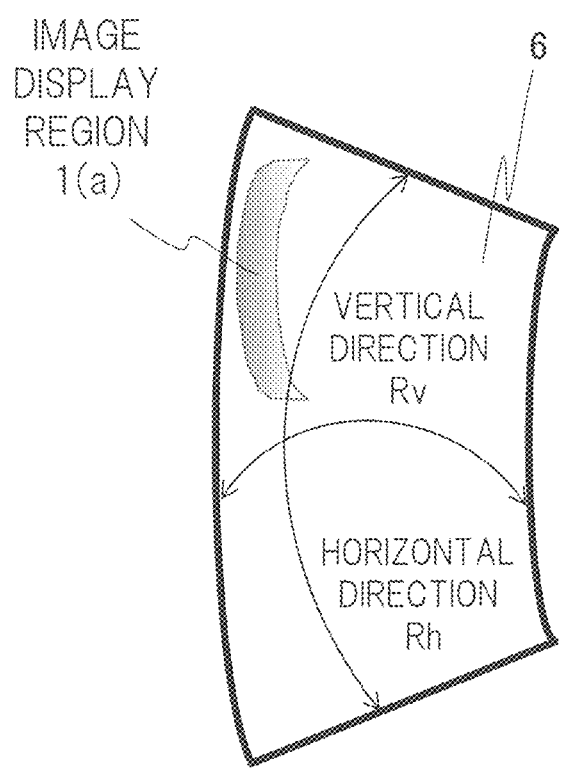
FIG. 3 is a configuration diagram for explaining a difference of a radius of curvature of a windshield.

On the other hand, as shown in FIG. 2, with respect to the windshield 6 of the vehicle, a radius of curvature Rv in a vertical direction of a body thereof is different from a radius of curvature Rh in a horizontal direction, and they generally have a relationship of Rh>Rv. For this reason, as shown in FIG. 3, when the windshield 6 is grasped as a reflecting surface, it becomes a toroidal surface of the concave mirror. For this reason, in the information display apparatus according to the present invention shown in FIG. 3, the shape of the concave mirror 1 may have different average radii of curvature between the horizontal direction and the vertical direction so as to correct the virtual image magnification by a shape of the windshield 6, that is, so as to correct a difference between the radii of curvature in the vertical direction and the horizontal direction of the windshield. In this case, in a case where the shape of the concave mirror 1 is a spherical or aspherical shape symmetric about the optical axis (that is, a shape expressed by Formula 2, which will be described later), it becomes a function of a distance r from the optical axis, a horizontal cross-sectional shape and a vertical cross-sectional shape of separated places cannot be controlled individually. Therefore, it is preferable to correct the difference as a function of a coordinate (x, y) on a surface from the optical axis of a mirror surface as a free-form surface expressed by Formula 1 (will be described later).

The explanation returns to FIG. 1 again. A lens element 2 is further arranged between the video display apparatus 4 and the concave mirror 1 as a transmissive optical component, for example. By controlling an emission direction of the ray to the concave mirror, aberration correction of the virtual image including astigmatism that occurs due to the difference between the radius of curvature in the horizontal direction and the radius of curvature in the vertical direction of the windshield 6 described above is realized at the same time as correction of distortion aberration is carried out in accordance with the shape of the concave mirror.

Further, in order to further heighten aberration correction capability, an optical element 2 as described above may be constituted by a plurality of lenses. Alternatively, by arranging a curved mirror in place of the lens element and controlling an incident position of the ray to the concave mirror 1 at the same time of folding of the optical path, it is possible to reduce distortion aberration. As described above, it goes without saying that it does not depart from technical ideas or a range of the present invention even though an optical element optimally designed to improve the aberration correction capability is further provided between the concave mirror 1 and the video display apparatus 4. Moreover, by changing a thickness of the optical element 2 described above in an optical axis direction, an optical distance between the concave mirror 1 and the video display apparatus 4 can be changed in addition to true aberration correction, whereby it is possible to continuously change a display position of the virtual image from a distant place to an adjacent position.

Further, by arranging the video display apparatus 4 so as to incline the same with respect to a normal line of the optical axis of the concave mirror 1, the difference of magnifications of the virtual image in the vertical direction may be corrected.

On the other hand, as a factor to deteriorate image quality of the information display apparatus, there is known a fact that a video light ray emitted from the video display apparatus 4 toward the concave mirror 1 is reflected by a surface of the optical element 2 arranged in the middle to return to the video display apparatus, and is then reflected again to be superimposed on true video light, whereby the image quality thereof is deteriorated. For this reason, in the present invention, it is preferable that the information display apparatus is designed so that not only antireflection coating is formed on the surface of the optical element 2 to suppress the reflection, but also a lens surface shape of any one or both of an incident surface and an emission surface of the optical element 2 for the video light is caused to have restriction of a shape so that the reflected light described above does not extremely focus on a part of the video display apparatus 4.

Next, in a case where a liquid crystal panel in which a polarizing plate is arranged in order to absorb the reflected light from the optical element 2 described above is used as the video display apparatus 4, it is possible to reduce deterioration in image quality. Further, the backlight 5 of the liquid crystal panel is controlled so that an incident direction of light incident on a liquid crystal panel 4 efficiently enters an incident eye of the concave mirror 1. Moreover, as the light source, a solid light source with long product lifetime may be adopted. Furthermore, it is preferable that polarization conversion is carried out by using a PBS (Polarizing Beam Splitter) in which optical means for reducing a divergent angle of light as LED (Light Emitting Diode) whose change in light output with respect to variation in ambient temperature is small is provided.

Polarizing plates are respectively arranged at the backlight 5 side (light incident surface) and the optical element 2 side (light emission surface) of the liquid crystal panel, thereby heightening a contrast ratio of the video light. In a case where iodine-based one in which the degree of polarization is high is adopted for the polarizing plate provided at the backlight 5 side (light incident surface), a high contrast ratio can be obtained. On the other hand, by using a dye-based polarizing plate for one provided at the optical element 2 side (light emission surface), it becomes possible to obtain high reliability even in a case where outside light enters or ambient temperature is high.

In a case where the liquid crystal panel is used as the video display apparatus, in particular, in a case where the driver wears polarized sunglasses in such a situation, a specific polarized wave is blocked or shielded, whereby a defect in which video cannot be viewed occurs. In order to prevent this situation, it is preferable that a λ/4 plate is arranged at a side of the optical element of the polarizing plate that is arranged at the optical element 2 side of the liquid crystal panel, whereby the video light uniformed to a specific polarization direction is converted into circular polarized light.

The controller 40 obtains, from such a navigation system 61, various kinds of information such as a speed limit and the number of lanes of a road corresponding to a current position at which the own vehicle is travelling, and a scheduled movement route of the own vehicle set to the navigation system 61 as foreground information (that is, information to be displayed at a front of the own vehicle by the virtual image described above).

A driving support ECU 62 is a controller that realizes driving support control by controlling a drive system and a control system in accordance with an obstacle detected as a result of monitoring by a circumference monitoring device 63. The driving support control includes well-known technologies such as cruise control, adaptive cruise control, pre-crush safety, lane keeping assist, for example.

The circumference monitoring device 63 is a device for monitoring a status of a circumference of the own vehicle. As one example, there are a camera that detects an object existing on the circumference of the own vehicle on the basis of an image obtained by photographing the circumference of the own vehicle, an exploratory device that detects an object existing around the own vehicle on the basis of a result obtained by transmitting and receiving an exploratory wave, and the like.

The controller 40 obtains such information from the driving support ECU 62 (for example, a distance to a preceding vehicle and a direction of the preceding vehicle, a position at which an obstacle or a traffic sign exists, and the like) as foreground information. Moreover, an ignition (IG) signal and own vehicle state information are inputted to the controller 40. The own vehicle state information among these kinds of information is information obtained as the vehicle information. For example, the own vehicle state information contains warning information indicating to become an abnormal state defined in advance, such as residual quantity of fuel for an internal-combustion engine or temperature of cooling water. Further, the own vehicle state information also contains an operational result of a direction indicator, travelling speed of the own vehicle, and shift position information. The controller 40 that has been mentioned above is activated when the ignition signal is inputted thereto. As the above, the whole system of the information display apparatus according to the present invention has been described.

<First Embodiment of Virtual Image Optical System>

Next, further details of a virtual image optical system according to the present invention and the video display apparatus will be described below.

As have already been mentioned above, FIG. 2 is a top view of the vehicle on which the information display apparatus according to the present invention is mounted. A windshield exists as the projected member 6 in front of a driver's seat of a vehicle body 101. Note that an inclination angle of this windshield with respect to the vehicle body is different depending upon a type of the vehicle. Moreover, the inventors researched this radius of curvature in order to realize an optimum virtual image optical system. As a result, as shown in FIG. 3, the inventors found that in the windshield, the radius of curvature Rh in the horizontal direction parallel to a contact surface of the vehicle is different from the radius of curvature Rv in the vertical direction orthogonal with respect to a horizontal axis, and there is generally a relationship below between Rh and Rv.

$Rh > Rv$

Further, it was also found that most of vehicles has this difference between the radii of curvature, that is, the Rh with respect to Rv in a range from 1.5 times to 2.5 times.

Next, the inventors also researched commercial products with respect to the inclination angle of the windshield. As a result, although it is different depending upon a vehicle body type, it was 20° to 30° in a light motor vehicle or a minivan type, 30° to 40° in a sedan type, and 40° or more in a sports type. Thus, in the present invention, a difference between the radius of curvature Rh in the horizontal direction of the windshield parallel to the contact surface of the vehicle and the radius of curvature Rv in the vertical direction orthogonal to the horizontal axis and the inclination angle of the windshield were considered to design the virtual image optical system.

More specifically, since the horizontal radius of curvature Rh and the vertical radius of curvature Rv of the windshield that is the projected member are greatly different from each other, good aberration correction was realized by providing the optical element 2 in the virtual image optical system. The optical element 2 is axially asymmetric with the horizontal axis of the windshield with respect to the optical axis (Z axis) and the axis vertical to this axis.

Next, the inventors carried out examination for miniaturization of the information display apparatus 100. As a condition of the examination, horizontal: 7° and vertical: 2.6° of FOV were set, and a virtual image distance is further set to 2 m, whereby the examination was carried out. At first of the examination, the concave mirror 1 to generate a virtual image (which is simply displayed as a plane mirror in FIG. 5 and FIG. 6 below), the video display apparatus 4, and the backlight 5 were prepared as a basic configuration, and one optical path folding mirror was arranged between the video display apparatus 4 and the concave mirror 1. Simulation was carried out by using, as parameters, arrangement of the respective members and a distance from the video display apparatus 4 to the concave mirror 1 so that volume of the information display apparatus 100 becomes the minimum.

Figure 5:
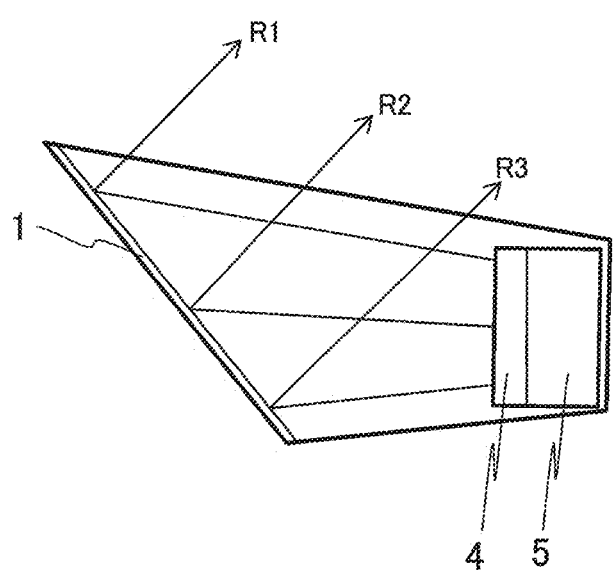
FIG. 5 is a schematic configuration diagram showing one embodiment of a virtual image optical system in the information display apparatus according to the present invention.
Figure 6:
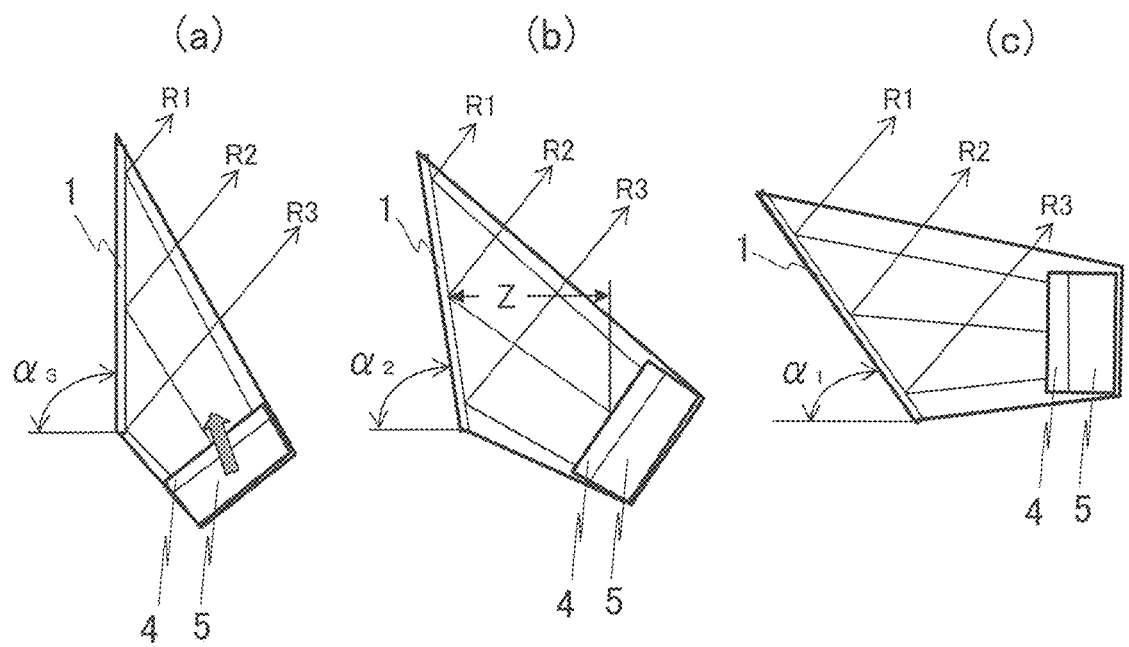
FIG. 6 is a schematic configuration diagram showing arrangement of the virtual image optical system in the information display apparatus as an embodiment of the present invention.

As a result, the volume when they were arranged so that video light from the video display apparatus 4 does not interfere with any of the members became 3.6 liters. Then, examination about a direct method in which the optical path folding mirror is removed was carried out for further miniaturization. FIG. 5 and FIG. 6 show results of the examination in a lump. Further, actual numerical values in FIG. 6 are shown in Table 1.

TABLE 1

| Distance between concave mirror and LCD (mm) | 40 | 47.3 | 61.4 | 74.8 | 87 | 100 |
|---|---|---|---|---|---|---|
| Volume of optical pan (ℓ) | 1.31 | 1.33 | 1.40 | 1.50 | 1.60 | 1.74 |
| Inner volume (ℓ) | 2.80 | 2.90 | 3.00 | 3.20 | 3.40 | 3.70 |

Figure 4:
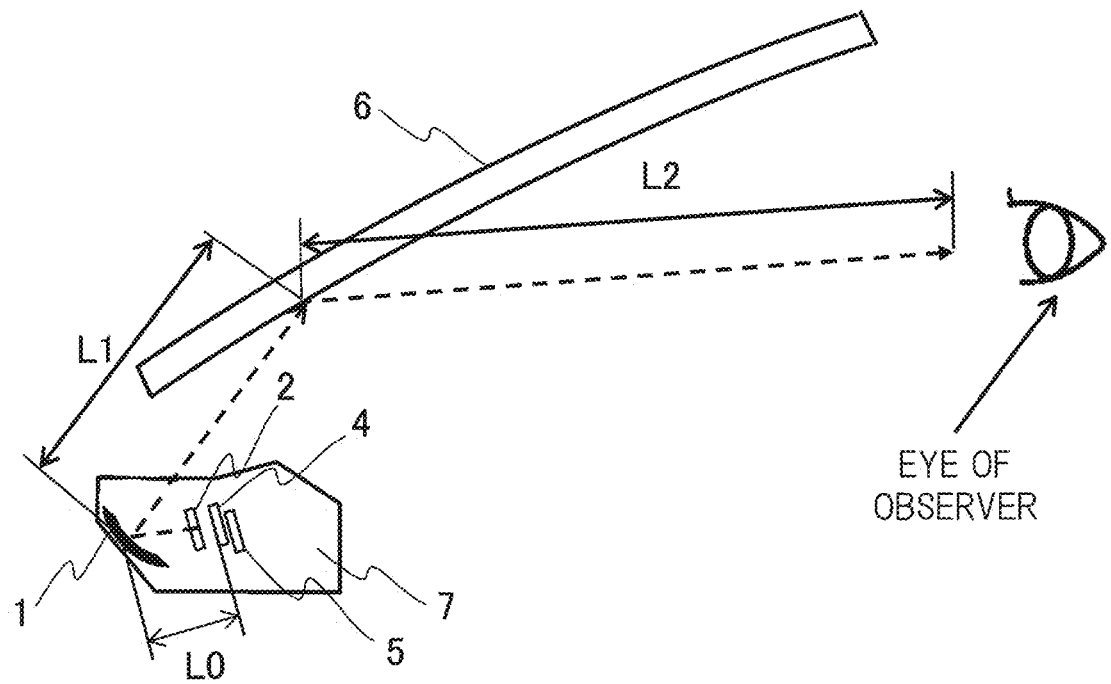
FIG. 4 is a schematic configuration diagram showing the information display apparatus, the windshield, and a viewpoint position of a driver.

A configuration of the virtual image optical system according to the present invention will be described with reference to FIG. 5. FIG. 5 is the configuration diagram showing a basic configuration to conduct a study for miniaturization in the virtual image optical system shown in FIG. 1 according to the first embodiment of the present invention. In order to simplify description thereof, an optical element for correcting aberration and distortion aberration is omitted, and across-sectional shape in a vertical direction is shown as well as the windshield 6 shown in FIG. 4. The liquid crystal panel is assumed as the video display apparatus 4, and the video display apparatus 4 is arranged at a position at which the virtual image of displayed video is obtained by the concave mirror 1 as a basic configuration in which the backlight 5 is arranged.

At this time, as shown in FIG. 5, each of video light R2 generated from video at a center, video light R1 generated from video at an upper end, and video light R3 generated at a lower end of the screen of the video display apparatus 4 is arranged so that the light is not interfered and blocked out by the video display apparatus 4 when they are reflected by the concave mirror 1, which becomes restriction in design.

In FIG. 6, in view of the design restriction described above, horizontal: 7° and vertical: 2.6° of the FOV are set at the same time, and a virtual image distance is further set to 2 m. Volume of the information display apparatus 100 was determined by using an interval Z between the concave mirror 1 and the video display apparatus 4 (the liquid crystal panel and the backlight 5) as a parameter. In a case where a distance Z is 100 mm, they have a configuration shown in FIG. 6(c). In this case, a vertical dimension of the concave mirror 1 can be made the smallest. In a case where the distance Z is set to 75 mm, as shown in FIG. 6(b), an angle $\alpha_2$ between a horizontal plane and the concave mirror 1 becomes larger, and the vertical dimension of the concave mirror 1 also becomes larger. When the distance Z is further reduced to be equal to or less than 50 mm, as shown in FIG. 6(a), an angle $\alpha_3$ between the horizontal plane and the concave mirror 1 further becomes larger, and the vertical dimension of the concave mirror 1 also further becomes larger.

Figure 7:
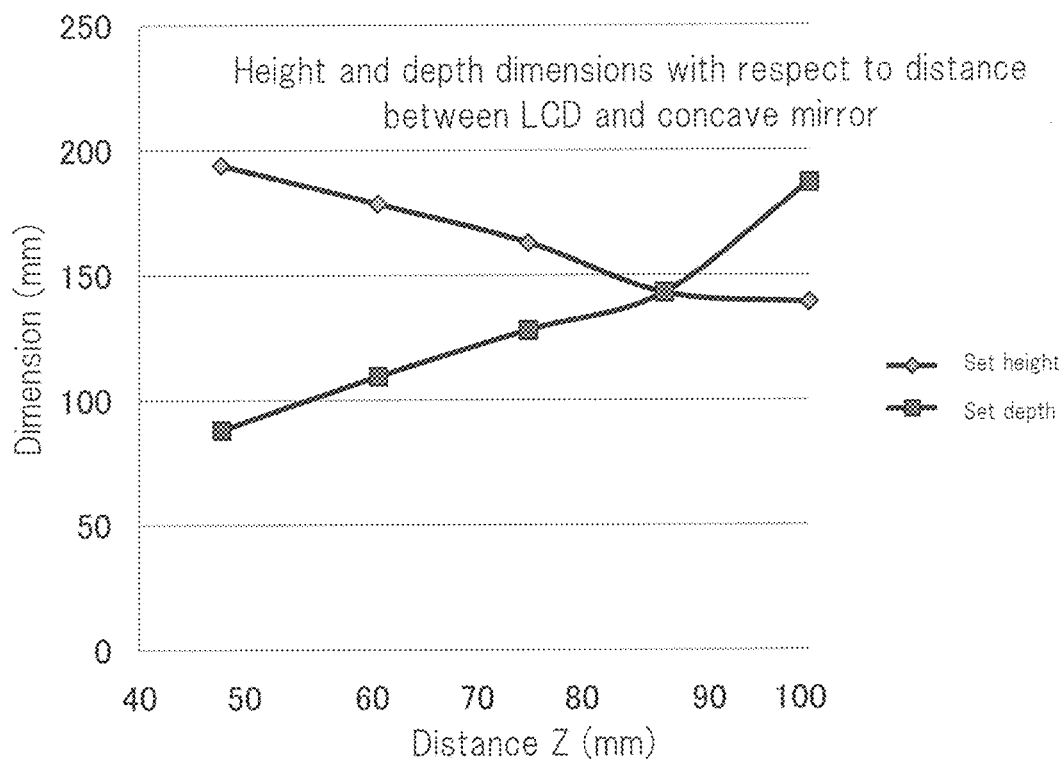
FIG. 7 is a diagram showing a relationship between a distance between a concave mirror and a video display apparatus of the virtual image optical system in the information display apparatus according to the present invention and a dimension of the apparatuses.
Figure 8:
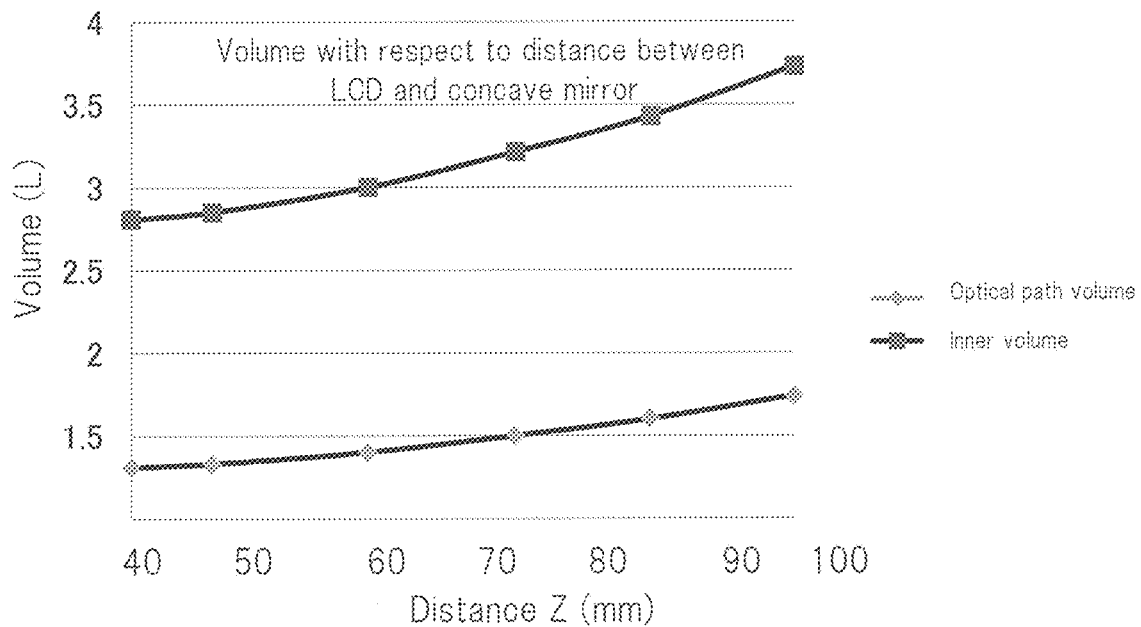
FIG. 8 is a diagram showing a relationship between the distance between the concave mirror and the video display apparatus of the virtual image optical system in the information display apparatus according to the present invention and volume of the apparatuses.

FIG. 7 is a result obtained by simulating a relationship between a set height and a set depth of the video display apparatus 4 by using the distance Z as a parameter. As the distance Z is made smaller, the set depth can be reduced, but the set height becomes higher. Similarly, FIG. 8 is a view obtained by simulating a relationship between the distance Z and set volume L. Compared with volume of a space from the video display apparatus 4 to the concave mirror (in FIG. 8, optical path volume and display), the set volume (containing volume of an LCD driving circuit, a light source driving circuit, and a backlight unit) changes as a boundary when the distance Z is 60 mm.

From the above, in order to miniaturize the information display apparatus 100, it was found that it is necessary to realize the virtual image optical system in which the distance Z to directly enlarge video displayed by the video display apparatus 4 with the concave mirror is short, and that it is necessary for the center of a video display unit of the video display apparatus 4 in the vertical direction of the screen to be arranged at a lower side than the center of the concave mirror 1.

On the other hand, in this arrangement, a distance (corresponding to the ray R1) between the video display apparatus 4 and the upper end of the concave mirror 1 becomes long, while a distance (corresponding to the ray R3) between the video display apparatus 4 and the lower end of the concave mirror 1 becomes short. Thus, by moving the video display apparatus 4 in a direction shown by an arrow in FIG. 6(a) and moving the same in a range so as not to interfere the video light (or block out the light), they may be arranged so that the distance between the video display apparatus 4 and the concave mirror 1 becomes even as much as possible.

Figure 9:
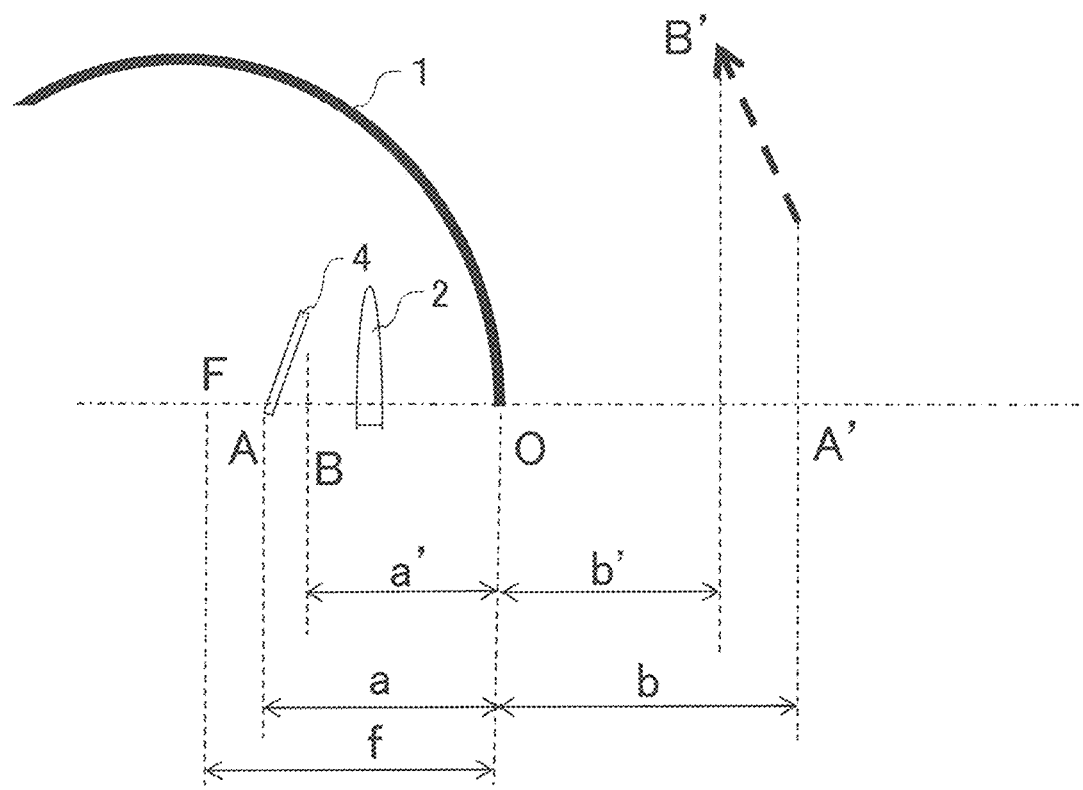
FIG. 9 is a schematic view for explaining a principle of the present invention.

In the virtual image optical system according to the present invention, distortion correction of the virtual image between the video display apparatus 4 and the concave mirror 1 and aberration correction by the optical element that corrects aberration generated by the virtual image are carried out. This will be described with reference to FIG. 9. Namely, by arranging the video display apparatus 4 (object point) inside a focal point F (focal point distance f) with respect to a point O on the optical axis of the concave mirror 1, it is possible to obtain the virtual image by the concave mirror 1. In FIG. 9, for convenience of explanation, the concave mirror 1 is regarded as a convex lens with the same positive refractive power, and a relationship among the object point, the convex lens (described by the concave mirror in FIG. 9 for convenience of explanation), and the virtual image to be generated is shown.

In the present invention, the optical element 2 is arranged in order to reduce distortion and aberration that occur on the concave mirror 1. This optical element may be configured by a transmissive optical lens or a concave mirror. However, a direction of the light flux incident on the concave mirror (an angle and a position thereof) is controlled so that:

(1) in a case where the video light from the video display apparatus 4 is made incident on the reflecting surface as a telecentric light flux, refractive power of the lens or the concave mirror 1 substantially becomes zero;

(2) in a case where the video light from the video display apparatus 4 is diverged and made incident on the optical element, the optical element has positive refractive power; and (3) in a case where the video light from the video display apparatus 4 is focused and made incident on the optical element, the optical element has negative refractive power.

Hereby, the distortion aberration of the generated virtual image is corrected. Moreover, in case of the transmissive optical lens, aberration regarding image forming performance generated in the virtual image is corrected by interaction between an incident surface at the video display apparatus 4 side and an emission surface at the concave mirror 1 side.

At this time, as described above, in a size of the virtual image viewed and recognized by the driver, each of a distance a between the video display apparatus 4 and the concave mirror 1 and a distance b between the concave mirror 1 and the virtual image, which are generated due to inclination of the windshield, is different between the upper end and the lower end of the virtual image.

For this reason, the inventors found that it is further better to reduce occurring distortion aberration by inclining the video display apparatus 4 with respect to the optical axis of the concave mirror 1 as shown in FIG. 9 to substantially match image magnification M'=b'/a' of an upper end portion of the virtual image with image magnification M=b/a of a lower end portion of the virtual image.

Moreover, by setting an average radius of curvature of a cross-sectional shape of the optical element 2 in a vertical direction and an average radius of curvature of a cross-sectional shape in a horizontal direction to different values, distortion aberration generated by an optical path difference that occurs due to a difference between the radius of curvature Rv in the vertical direction and the radius of curvature Rh in the horizontal direction of the windshield described above and aberration to deteriorate the image forming performance of the virtual image are corrected.

As mentioned above, in the information display apparatus 100 that obtains a virtual image by directly reflecting video light to the windshield 6, correction of aberration generated by the optical path difference that occurs due to the difference between the radius of curvature Rv in the vertical direction and the radius of curvature Rh in the horizontal direction of the windshield 6 becomes the most important for securement of the image forming performance of the virtual image.

For this reason, the inventors reduced deterioration of the image forming performance of the virtual image due to the difference between the radii of curvature of the windshield described above by using a free-form surface shape (see Formula 1 below) capable of defining a shape of a surface as a function of an absolute coordinate (x, y) from the optical axis against an aspherical shape (see (Formula 2) below), which has been used in a conventional optical design, to define a shape of a lens surface or mirror surface as a function of the distance r from the optical axis.

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n) \quad \text{[Formula 1]}$$

$$j = [(m+n)^2 + m + 3n]/2 + 1$$

Note that the aspherical shape to define the shape of the lens surface or mirror surface is expressed as a function of the distance r from the optical axis like Formula 2 below.

$$Z = \frac{c \cdot h^2}{1 + \sqrt{1 - (1+K)c^2 \cdot h^2}} + A \times h^4 + B \times h^6 + C \times h^8 + \quad \text{[Formula 2]}$$
$$D \times h^{10} + E \times h^{12} + F \times h^{14} + G \times h^{16} + H \times h^{18} + J \times h^{20}$$

Figure 10:
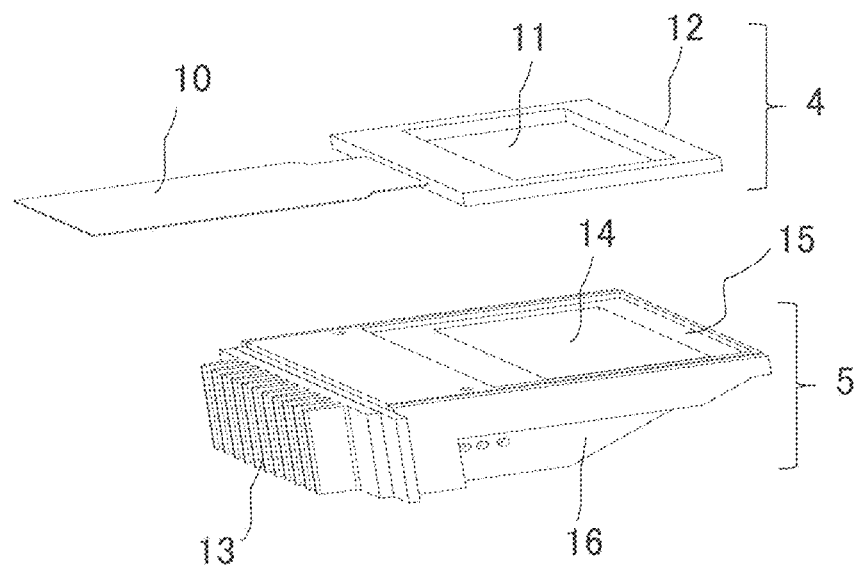
FIG. 10 is a configuration diagram showing arrangement of the video display apparatus and a light source apparatus in the information display apparatus according to the present invention.

FIG. 10 is an enlarged view of a main portion of the liquid crystal panel and a backlight light source 5 as the video display apparatus 4 in the virtual image optical system according to the first embodiment described above. By modulating light from the backlight by a video signal inputted from a flexible board 10 of the liquid crystal panel, video is displayed on a liquid crystal panel display surface 11, and a virtual image is generated from the displayed video by the virtual image optical system (including a free-form surface concave mirror and a free-form surface optical element in the embodiment) to inform the driver of video information.

In the configuration described above, an LED light source with relatively inexpensive and high reliability as a solid light source is used for a light source element of the backlight light source 5. A surface emission type of LED is used for high output. Therefore, light utilization efficiency is improved by using technical ingenuity (will be described later). Emission efficiency of the LED with respect to input electric power is different depending upon emission color, and is about 20% to 30%. The remaining is almost converted into heat. For this reason, as a frame to attach the LED, by providing a fin 13 for heat radiation configured by a member with high thermal conductivity (for example, a metallic member such as aluminum) to radiate heat to the outside, an effect to improve the emission efficiency of the LED itself can be obtained.

In particular, emission efficiency of an LED using red as emission color, which currently goes on the market, is significantly deteriorated when junction temperature becomes higher, and chromaticity of video changes at the same time. Thus, it is preferable that the light source element is configured so that priority to reduce temperature of the LED is raised and an area of the corresponding radiation fin becomes larger to improve cooling efficiency. In order to guide light diffused from the LED to the liquid crystal panel 4 efficiently, a light guide element 18 is used in the example shown in FIG. 11. However, it is preferable that the whole is covered by an exterior member 16 to unify the backlight light source so that dust or the like does not adhere thereto, for example.

Figure 11:
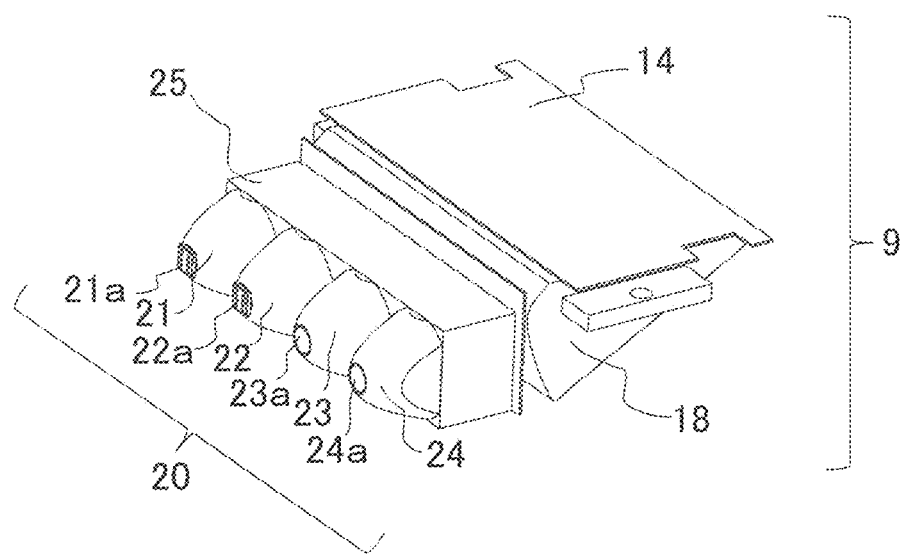
FIG. 11 is a schematic configuration diagram showing a configuration of the light source apparatus in a video display unit according to the present invention.

Further, FIG. 11 shows an enlarged view of a main part of a light source unit including an LED that is a light source, a light guide element and a diffused plate. As is apparent from FIG. 11, by inserting a medium between the LEDs to optically connect openings 21a, 22a, 23a, 24a that take in divergent light rays from LEDs of light funnels 21, 22, 23, and 24 to each other as a plane or by having a focusing action as a convex shape to cause the light source light to be diverged to become parallel light as much as possible, an incident angle of light made incident on a boundary surface of the light funnel is made smaller. As a result, the divergent angle can further be made smaller after passing through the light funnel. Therefore, control of the light source light directed to the liquid crystal panel after being reflected by the light guide element 18 can be facilitated.

Moreover, in order to improve utilization efficiency of divergent light from the LED, polarization conversion is carried out for a joining portion 25 between the light funnels 21 to 24 and the light guide element 18 by using a PBS (Polarizing Beam Splitter) to convert that of the light to a desired polarization direction, whereby it is possible to improve efficiency of incident light to the LCD.

In a case where the polarization direction of light source light is uniformed as described above and material with low birefringence is used as raw material of the light guide element 18 to rotate a direction of the polarized wave and pass through the liquid crystal panel, it is further preferable that problems such as coloring at the time of black display does not occur, for example.

As mentioned above, the light flux from the LED whose divergent angle is reduced is controlled by the light guide element; is reflected by a totally reflecting surface that is provided an inclined surface of the light guide element 18; is diffused by a diffusing member 14 arranged between an opposing surface and the liquid crystal panel; and is then made incident on the liquid crystal panel 4 as the video display apparatus. In the present embodiment, as described above, the diffusing member 14 is arranged between the light guide element 18 and the liquid crystal panel 4. However, the similar effect can be obtained even though a diffusing effect is caused to have an end surface of the light guide element 18 to provide a fine uneven shape, for example.

Figure 12:
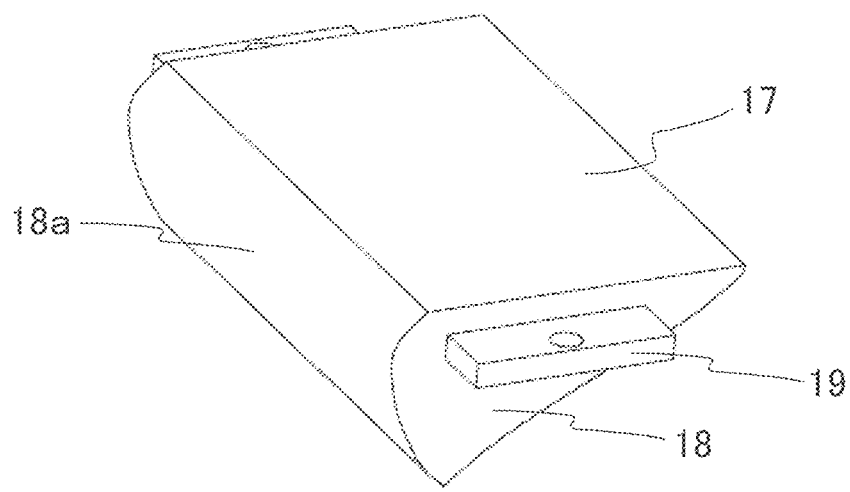
FIG. 12 is a schematic configuration diagram showing a shape of a light guide element in the light source apparatus according to the present invention.

Next, a configuration of the light guide element 18 described above and effects obtained by the same will be described with reference to FIG. 12 and FIG. 13. FIG. 12 is an outline view showing the light guide element 18 according to the present invention. The light flux whose divergent angle is reduced by the light funnels 21 to 24 shown in FIG. 11 is made incident on a light incident surface 18a of the light guide element 18. At this time, the divergent angle of the vertical direction (vertical direction in FIG. 13) is controlled by a shape (FIG. 13 shows a cross-sectional shape) effect of the incident surface, and the light flux efficiently transmits within the light guide element 18.

Figure 13:
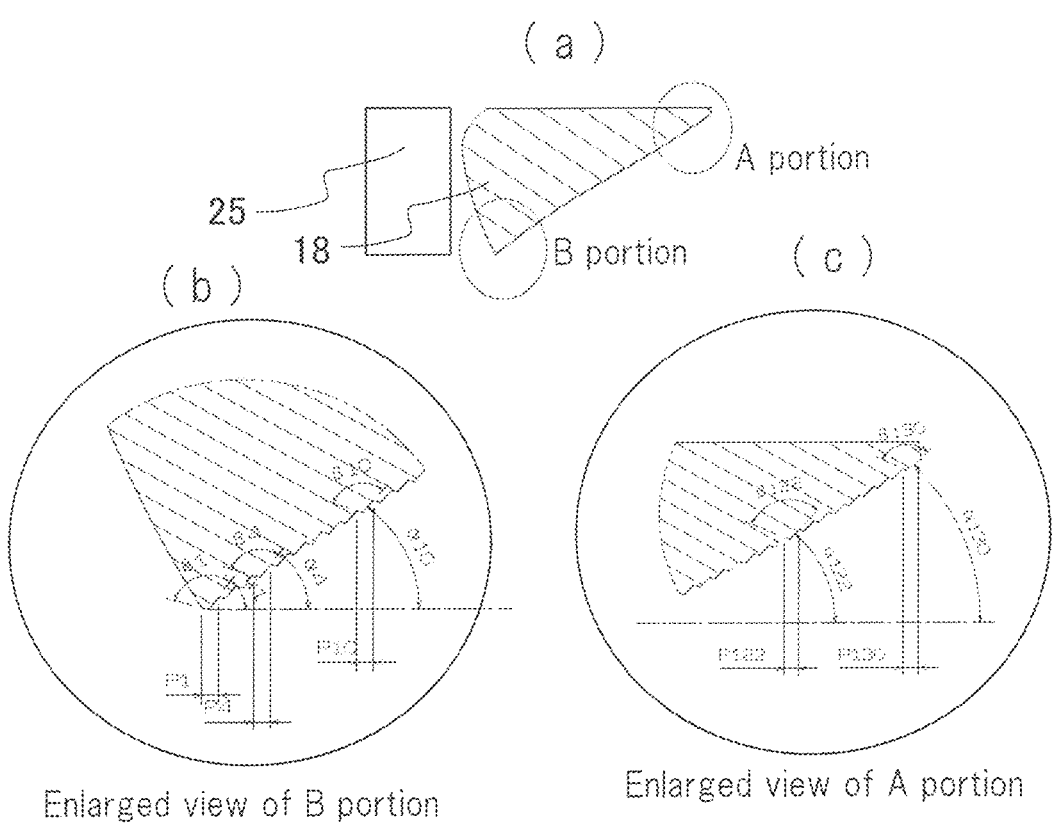
FIG. 13 is a schematic configuration diagram showing a cross-sectional shape of the light guide element in the light source apparatus according to the present invention.

FIG. 13 is an enlarged cross-sectional view of a main portion of the light guide element. The light source light whose divergent angle is reduced by the light funnels 21 to 24 is made incident from the incident surface 18a via the joining portion 25 as described above, and is totally reflected by a prism 18 as the light guide element 18, which is provided on the opposing surface, toward an opposing surface 17. A shape of the totally reflecting prism 18 is divided and formed in a stepwise shape in the vicinity (enlarged view of B portion) of and at an end portion (enlarged view of A portion) of the incident surface 18a in accordance with the divergent angle of the light flux made incident on each surface, whereby an angle of the totally reflecting surface is controlled. On the other hand, an arrival position and an amount of energy of the divided light flux after reflection are controlled by using a division dimension of the totally reflecting surface described above as variables so that light quantity distribution of the light flux made incident on the liquid crystal panel 4 that is the video display apparatus becomes uniform in the emission surface of the liquid crystal panel 4.

Figure 14:
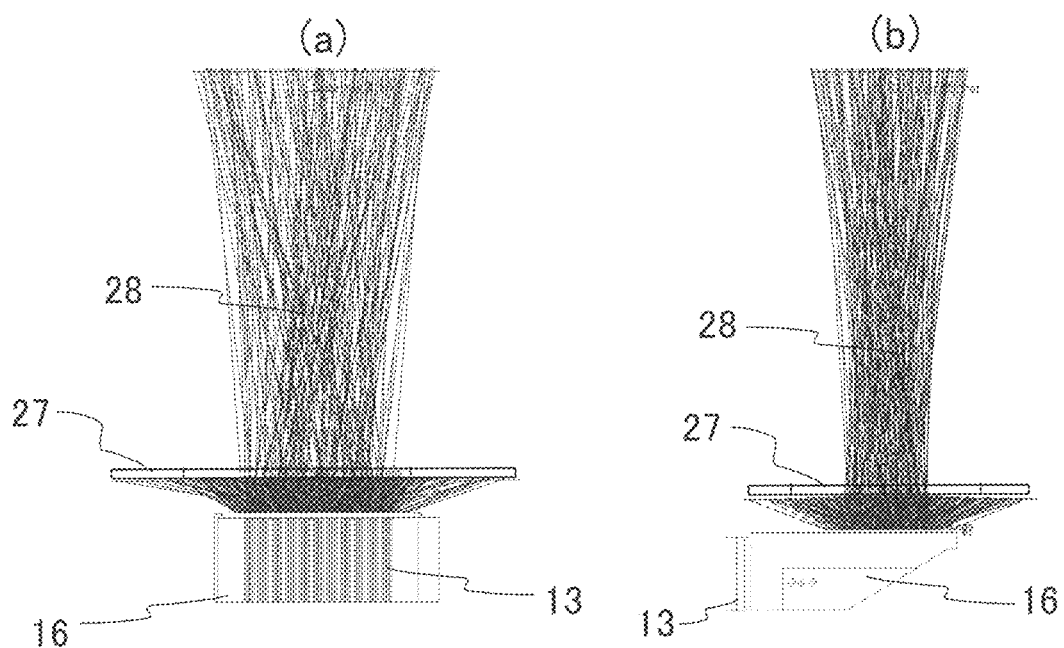
FIG. 14 is a schematic view for explaining an emission status of a light flux from the video display apparatus and the light source apparatus in the information display apparatus according to the present invention.

FIG. 14 shows a result obtained by simulating a state where emission light from the backlight described above passes through the liquid crystal panel in the information display apparatus according to the present invention 100. FIG. 14(*a*) is a view showing an emission state of light when viewed from a longitudinal direction of the liquid crystal panel. FIG. 14(*b*) shows an emission state of light when viewed from a short direction (that is, a direction perpendicular to the longitudinal direction thereof) of the liquid crystal panel. In the present invention, the horizontal angle of the FOV is widened more than its design. Therefore, it is designed that brightness of the virtual image viewed and recognized by right and left eyes is not changed extremely even in a case where a diffusion angle in a horizontal direction is enlarged with respect to that in a vertical direction and a position of eyes is moved by rotation of the driver's head.

Figure 15:
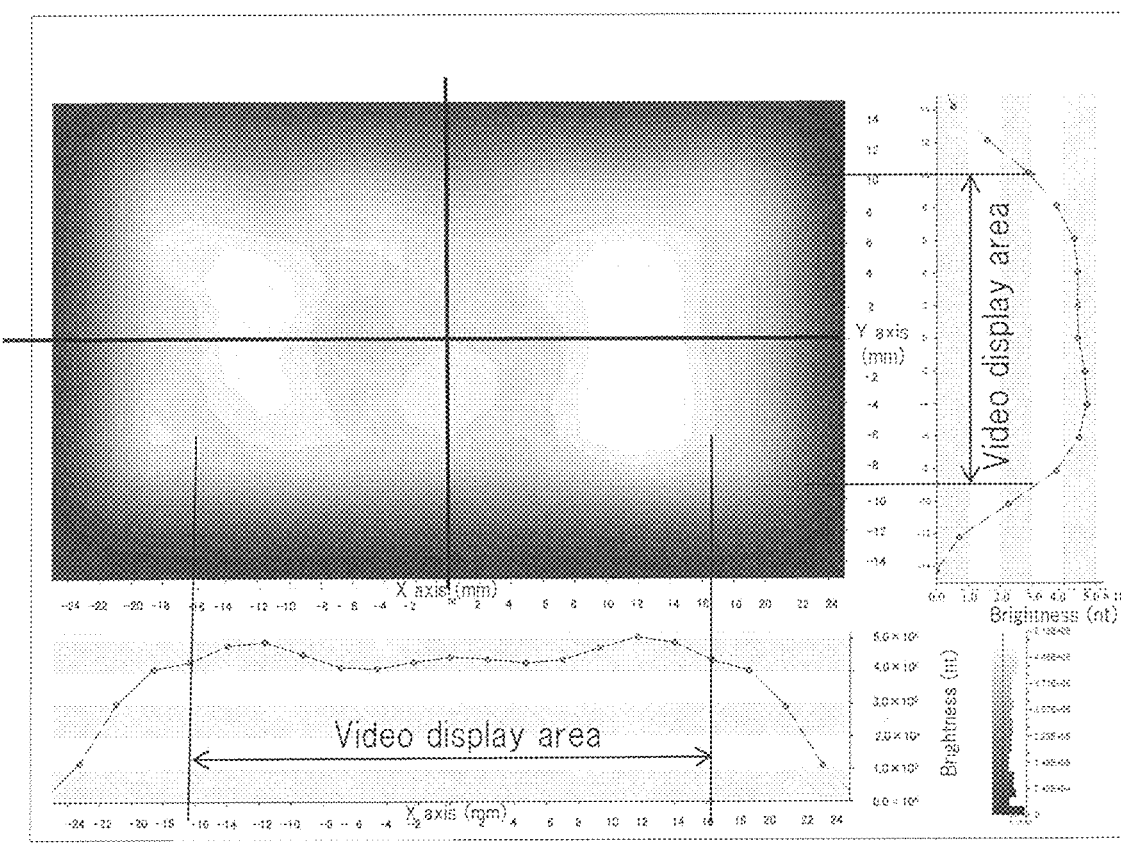
FIG. 15 is a characteristic diagram for explaining emission light distribution of the light flux from the light source apparatus for the video display apparatus in the information display apparatus according to the present invention.
Figure 16:
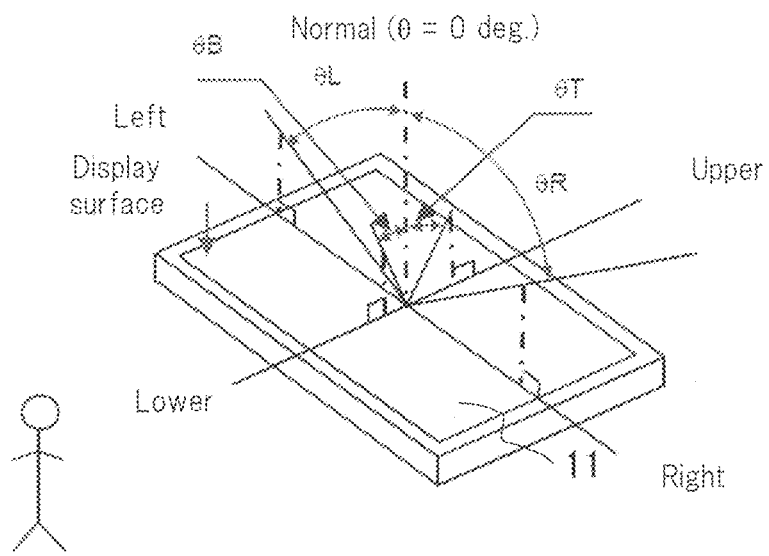
FIG. 16 is a conceptual diagram showing a method of characteristic evaluation for a liquid crystal panel as the video display apparatus.

Further, like the embodiment of the present invention, FIG. 15 and FIG. 16 show brightness distribution of the emission surface of the liquid crystal panel 4 and a method of characteristic evaluation of the liquid crystal panel in case of using the backlight by controlling an emission direction and intensity of light by using the light guide element 18. As is apparent from FIGS. 15 and 16, inclination of deterioration of brightness outside an effective range of the vertical direction (long side direction) of the screen can be made smaller with respect to the brightness distribution of the vertical direction (short side direction) of the screen.

Figure 17:
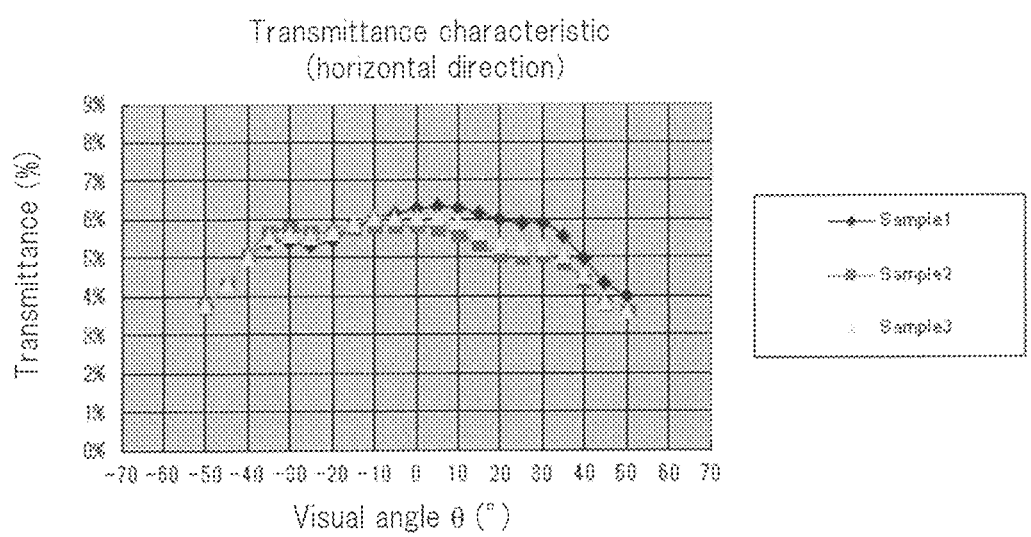
FIG. 17 is a characteristic diagram showing a transmittance characteristic of a screen in a horizontal direction of the liquid crystal panel as the video display apparatus.
Figure 18:
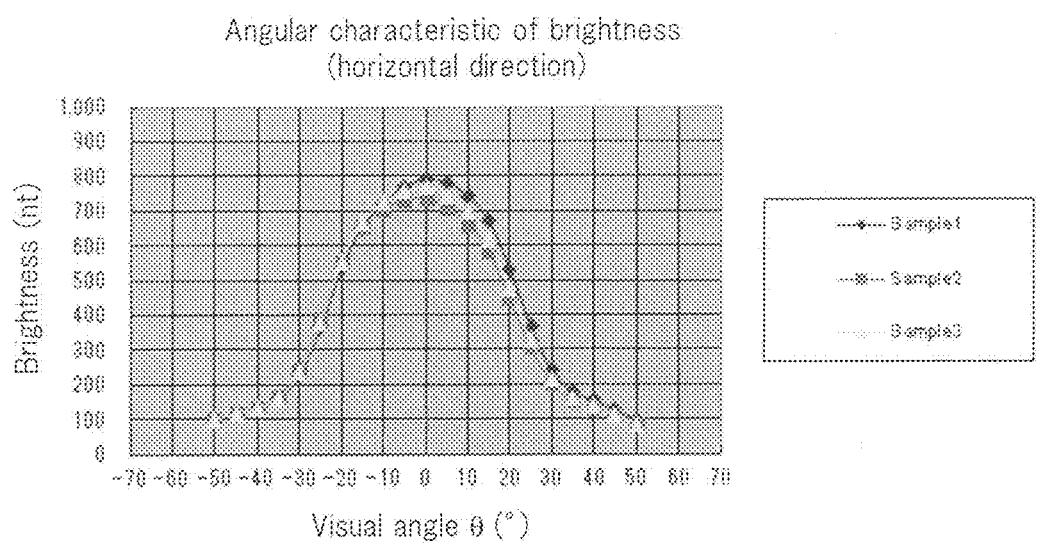
FIG. 18 is a characteristic diagram showing an angular characteristic of brightness of the screen in the horizontal direction in a case where white is displayed on the liquid crystal panel as the video display apparatus.
Figure 19:
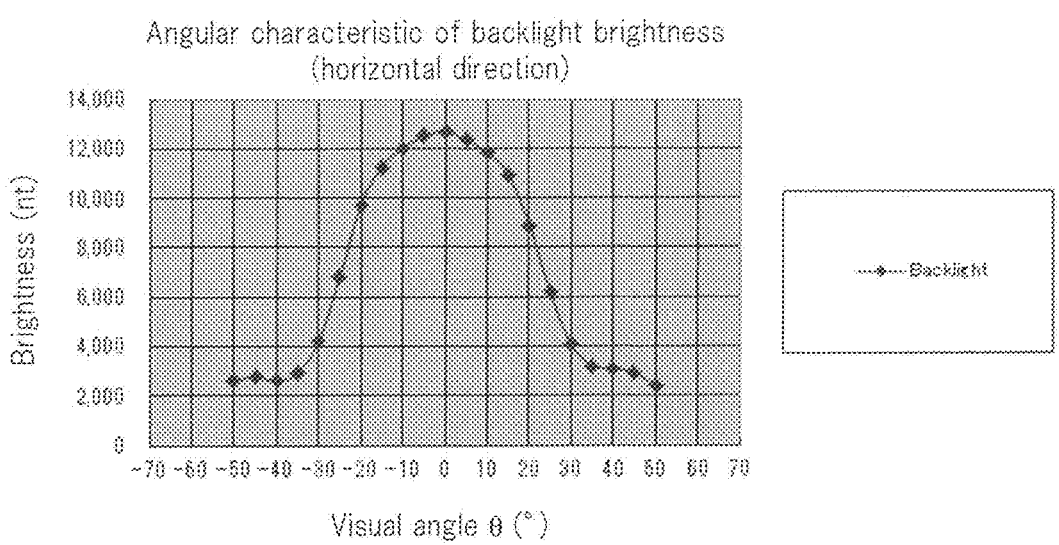
FIG. 19 is a characteristic diagram showing an angular characteristic of backlight brightness in the horizontal direction of the liquid crystal panel as the video display apparatus.
Figure 20:
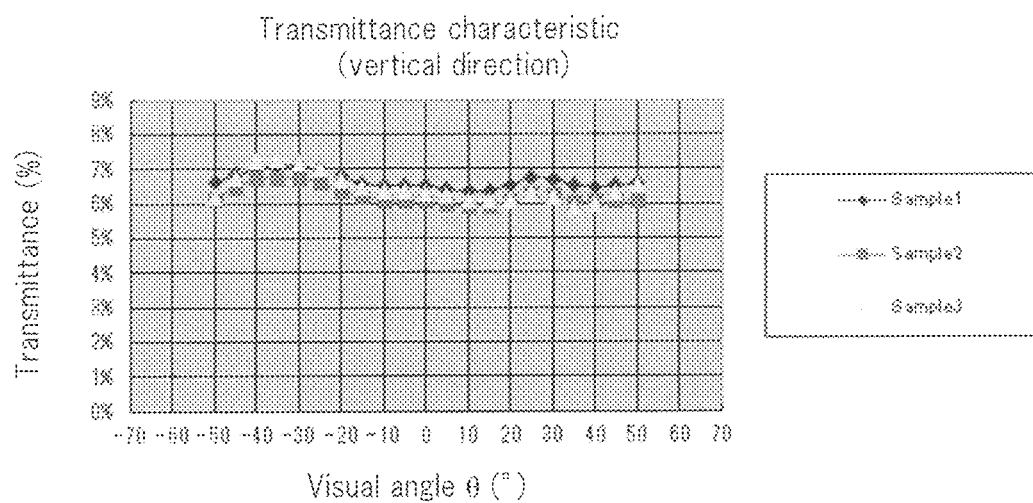
FIG. 20 is a characteristic diagram showing the angular characteristic of transmittance in a vertical direction of the liquid crystal panel as the video display apparatus.
Figure 21:
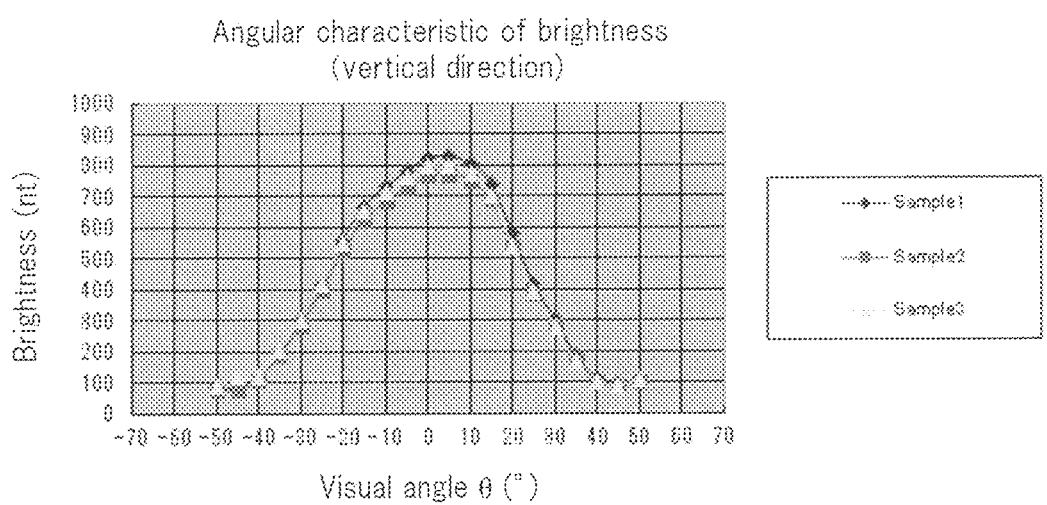
FIG. 21 is a characteristic diagram showing the angular characteristic of brightness in the vertical direction when white is displayed on the liquid crystal panel as the video display apparatus.
Figure 22:
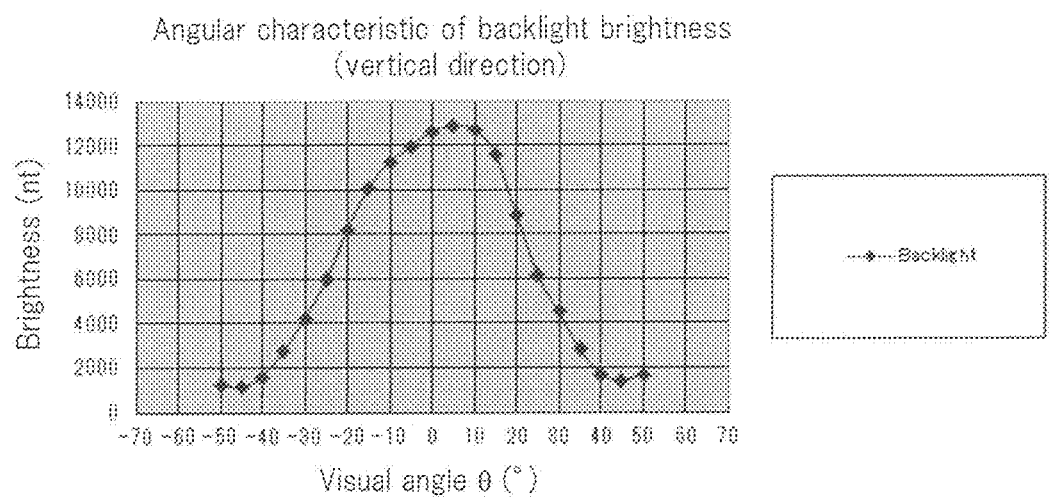
FIG. 22 is a characteristic diagram showing an angular characteristic of backlight brightness in the vertical direction of the liquid crystal panel as the video display apparatus.

The emission light (video light) from the liquid crystal panel that is used as the video display apparatus in the information display apparatus according to the present invention 100 indicates predetermined transmittance in a range of ±50° as shown in FIG. 17 and FIG. 20 in a case where visual angles in horizontal and vertical directions are used as a parameter. In a case where a range of the visual angle falls within ±40°, it is possible to obtain a better transmittance characteristic. As a result, as shown in FIG. 18 and FIG. 21, brightness of the screen greatly varies depending upon a direction to view the screen (visual angle) in the horizontal direction and the vertical direction of a display screen. This is caused by an angular characteristic of backlight brightness shown in FIG. 19 and FIG. 22.

Figure 23:
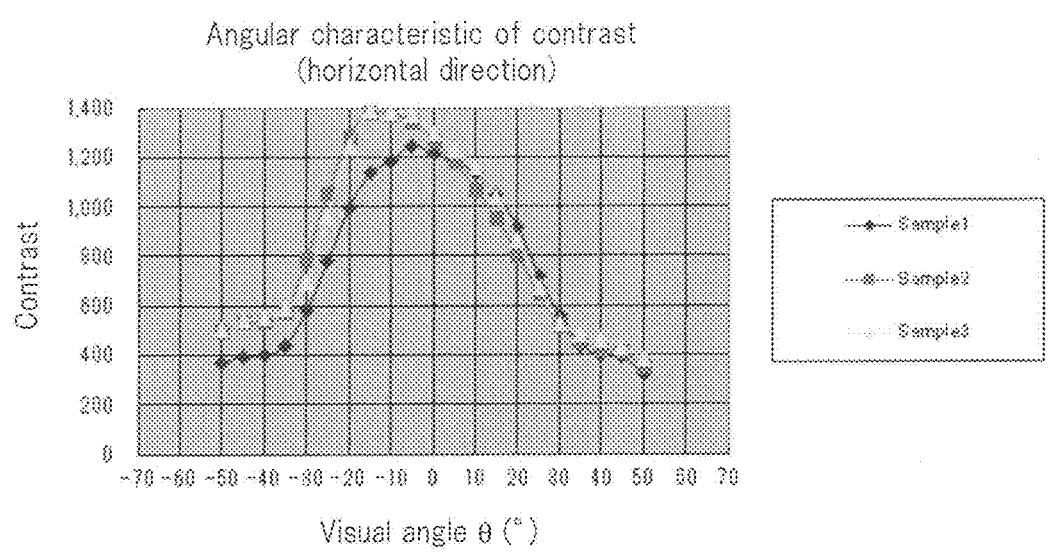
FIG. 23 is a characteristic diagram showing an angular characteristic of contrast in the horizontal direction of the liquid crystal panel as the video display apparatus.
Figure 25:
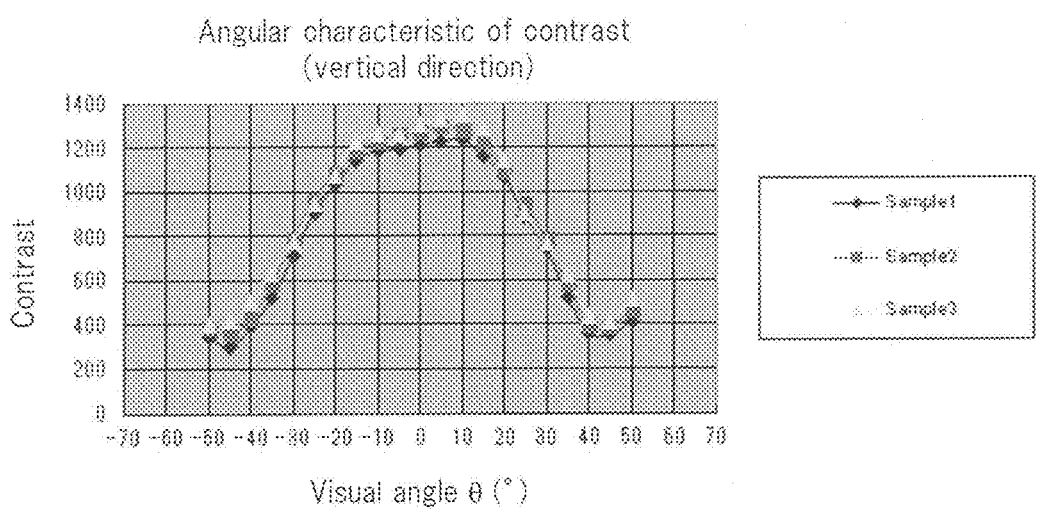
FIG. 25 is a characteristic diagram showing an angular characteristic of contrast in the vertical direction of the liquid crystal panel as the video display apparatus.

For this reason, the inventors obtained high brightness by controlling the angle of the totally reflecting surface of the light guide element 18 and the divergent angle of the light source light from the LEDs of the light funnels 21 to 24 to narrow visual angle property of the backlight into a small range so that the emission light from the liquid crystal panel 4, which is taken in the virtual image optical system, can be obtained as light vertical to the screen as much as possible. Specifically, as shown in FIG. 18 and FIG. 21, in order to obtain video with high brightness, light in a range of ±30° in a right-and-left viewing angle is used, and contrast performance shown in FIG. 23 and FIG. 25 is considered. By narrowing it to ±20° or smaller, the virtual image using a source image with good image quality could be obtained at the same time.

Figure 24:
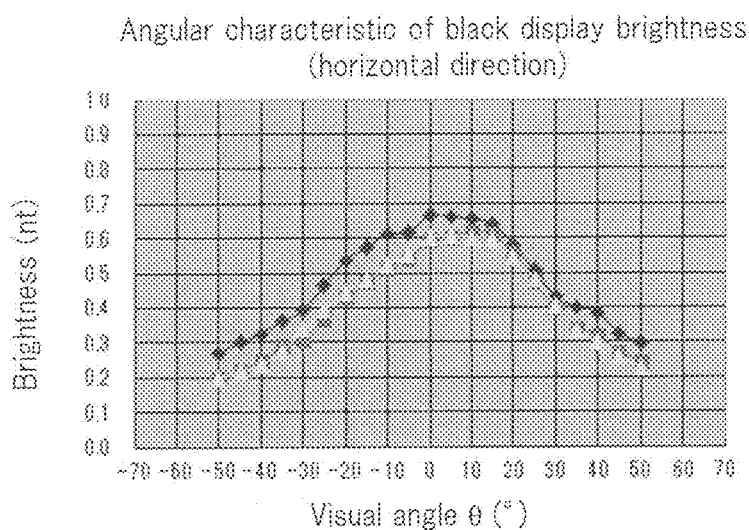
FIG. 24 is a characteristic diagram showing an angular characteristic of black display brightness in the horizontal direction of the liquid crystal panel as the video display apparatus.
Figure 26:
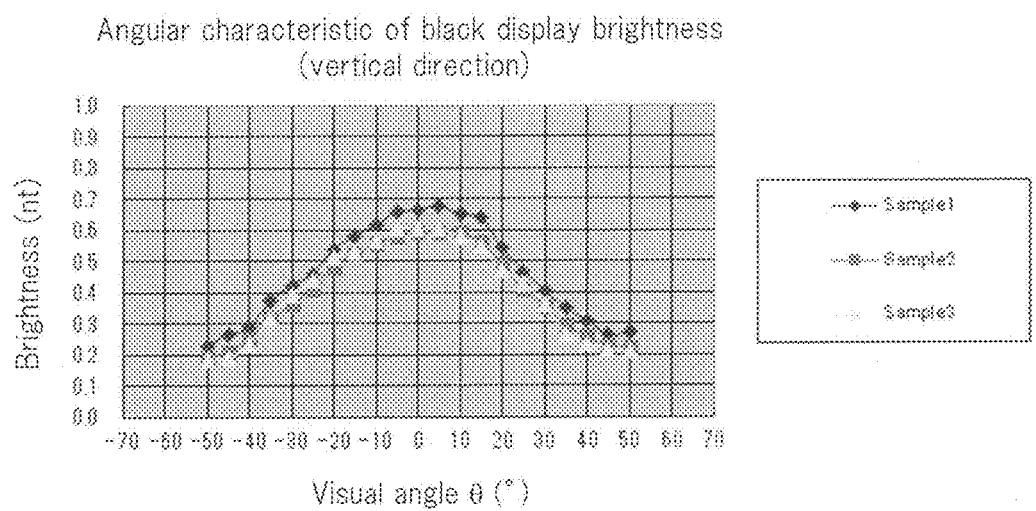
FIG. 26 is a characteristic diagram showing an angular characteristic of black display brightness in the vertical direction of the liquid crystal panel as the video display apparatus.
Figure 27:
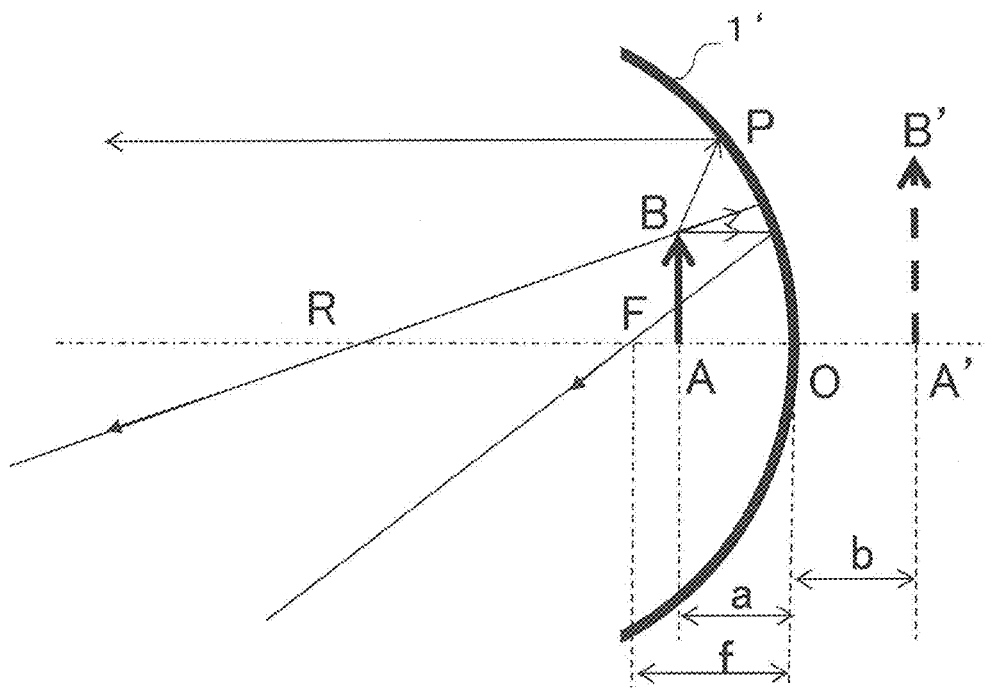
FIG. 27 is a schematic view for explaining a principle of a virtual image optical system according to a conventional technique.

As mentioned above, the contrast performance that influences the image quality of the video display apparatus is determined by to what extent brightness when black as a basis to determine image quality is displayed (in FIG. 24 and FIG. 26, indicated by "black display brightness") can be lowered. For this reason, it is preferable that an iodine-based polarizing plate in which the degree of polarization is high is used between the liquid crystal panel 4 and the backlight.

On the other hand, by using a dye-based polarizing plate as a polarizing plate provided at the optical element 2 side (light emission surface), it is possible to obtain high reliability even in a case where outside light enters therein or ambient temperature is high.

In a case where color display is executed in the liquid crystal panel 4, color filters corresponding to the respective pixels are provided. For this reason, in a case where light source color of the backlight is white, light absorption with the color filters becomes greater, and loss thereof becomes larger. Thus, as shown in FIG. 11 described above, the inventors use a plurality of LEDs:

(1) to add a green LED whose contribution to brightness is large compared with the case where a plurality of white LEDs is used.

(2) to add a red or blue LED to the white LED to improve glossy property of an image.

(3) to individually arrange red, blue, and green LEDs, add a green LED whose contribution to brightness is large, and individually drive the LEDs, thereby enlarging a color reproduction range to heighten glossy property as well as to improve brightness.

(4) to raise transmittance of each color filter with respect to peak brightness of red, blue, green LEDs by implementing the above (3) to improve brightness as a whole.

(5) to reduce damage of the polarizing plate at an incident side of the liquid crystal panel as a second embodiment of the backlight by arranging the PBS between the light funnels and the light guide element to uniform it to a specific polarized wave.

It goes without saying that a polarization direction of the polarizing plate that is arranged at the incident side of the liquid crystal panel may be a direction through which the polarized wave uniformed to a specific direction after passing through the PBS (Polarizing Beam Splitter) passes.

As mentioned above, as a video light source apparatus 4 according to the embodiment of the present invention, a λ/4 plate can be provided on the emission surface of the liquid-crystal display panel to convert the emission light to circular polarized light. As a result, the driver is allowed to monitor a good virtual image even though he or she wears polarized sunglasses.

Moreover, by forming reflection coating for the reflecting mirror used in the virtual image optical system by metallic multilayer, angular dependence of reflection power is small, and the reflection power is never changed by a polarization direction (a P wave or S wave). Therefore, it becomes possible to uniformly keep chromaticity and brightness of the screen.

Moreover, in a case where an ultraviolet ray reflecting film or an optical member obtained by combining the ultraviolet ray reflecting film and an infrared ray reflecting film is provided between the virtual image optical system and the windshield, temperature rise of the liquid-crystal display panel and the polarizing plate and damage therefrom can be reduced even though outside light (solar light) enters it. Therefore, an effect that reliability of the information display apparatus is not impaired can be obtained.

Further, in the virtual image optical system, optimum design including a difference between the radius of curvature in the horizontal direction and the radius of curvature in the vertical direction of the windshield that is the projected member in the conventional technique in the vehicle is carried out. The concave mirror 1 whose concave surface faces the windshield 6 side is arranged between the windshield and the video display apparatus or an intermediate image display unit. This causes video of the video display apparatus to be enlarged, and the video is reflected by the windshield 6. At this time, the optical element is arranged between the concave mirror 1 described above and the video display apparatus 4. On the other hand, video light flux to form an enlarged image (virtual image) of the video, which is formed so as to correspond to a viewpoint position of the driver, passes through the optical element arranged between the concave mirror and the video display apparatus, thereby correcting distortion and/or aberration that occurs in the concave mirror 1. For that reason, a virtual image in which distortion and aberration are reduced significantly can be obtained compared with the virtual image optical system including only the conventional concave mirror.

Moreover, in the present invention shown in FIG. 1, it is necessary to form a virtual image obtained by being reflected at the upper portion of the windshield 6 (that is, an upper portion in a vertical direction of the vehicle body) at a far position. For this reason, in order to favorably form the video light flux diverged from the upper portion of the video display apparatus by which the video corresponding to this is displayed, it is necessary that a focal point distance f1 of the optical element arranged between the concave mirror 1 described above and the video display apparatus 4 is made shorter, and to the contrary, the virtual image obtained by being reflected at the lower portion of the windshield 6 (that is, a lower portion in a vertical direction of the vehicle body) is formed in the vicinity thereof. For this reason, in order to favorably form the video light flux diverged from the lower portion of the video display apparatus by which the video corresponding to this is displayed, a composite focal point distance f2 of a plurality of optical elements arranged between the concave mirror 1 described above and the video display apparatus 4 may be set to be relatively longer.

Further, in the present invention, the radius of curvature in the horizontal direction (parallel to the ground) of the windshield 6 is different from the radius of curvature in the vertical direction (that is, a direction vertical to the horizontal direction of the windshield), whereby screen distortion of the virtual image viewed by the driver is corrected. Therefore, by arranging the optical element whose axis symmetric property is different with respect to the optical axis in the virtual image optical system, correction of the distortion described above is achieved.

As described above, the sheet-like light source apparatus suitable to be used for an electronic apparatus provided with the image display device according to various embodiments of the present invention has been described. However, the present invention is not limited to the embodiments described above, and various modifications are contained. For example, the whole system has been explained in detail in the embodiments described above for explaining the present invention clearly. The present invention is not necessarily limited to one that includes all configurations that have been explained. Further, a part of the configuration of one embodiment can be replaced by a configuration of the other embodiment. Further, a configuration of the other embodiment can be added to a configuration of one embodiment. Moreover, a part of the configuration of each of the embodiments can be added to the other configuration, deleted or replaced thereby.

REFERENCE SINGS LIST

100 . . . information display apparatus, 101 . . . vehicle, 1 . . . concave mirror, 2 . . . optical element, 4 . . . liquid-crystal display panel, 5 . . . backlight light source, 6 . . . projected member (windshield), 7 . . . housing, V1 . . . virtual image, 8 . . . EyeBox (eyes of observer), 9 . . . light source unit, R1 . . . upper video light, R2 . . . central video light, R3 . . . lower video light, 10 . . . flexible board, 11 . . . video display surface, 12 . . . frame, 13 . . . fin, 14 . . . diffusing member, 16 . . . exterior member, 17 . . . emission surface, 18 . . . light guide element, 20 . . . light funnel unit, 21 . . . light funnel, 22 . . . light funnel, 23 . . . light funnel, 24 . . . light funnel, 21a . . . light funnel opening, 22a . . . light funnel opening, 23a . . . light funnel opening, 24a . . . light funnel opening, 25 . . . joining portion (PBS).

The invention claimed is:

1. A head-up display apparatus comprising:
a display element configured to display an image;
a light source apparatus configured to supply light to the display element; and
an optical system configured to display a virtual image on a basis of light from the display element,
wherein the light source apparatus includes a light guide element having a reflecting surface configured to adjust a divergent angle in a light emission direction toward the display element, the light guide element being configured to propagate light from a light source to the display element,
wherein the optical system includes an optical element and a reflecting mirror that are arranged on an optical path,
wherein the optical element has a surface shape configured to adjust a direction of a light flux made incident on the reflecting mirror in accordance with a ray emission angle from the display element,
wherein in accordance with radii of curvature of a vertical direction and a horizontal direction of a windshield, a horizontal cross-sectional shape of the reflecting mirror is a shape in which an average radius of curvature of an upper portion is different from that of a lower portion with respect to the vertical direction in a state where the reflecting mirror is arranged on the optical path,
wherein the display element is arranged so that a center of a display area of the display element is lower than a center of the reflecting mirror with respect to the vertical direction,
wherein the reflecting mirror is arranged so that reflected light from the reflecting mirror is not blocked by the display element and the optical element, and
wherein by changing a thickness of the optical element in an optical axis direction by the vertical direction, an optical distance between the reflecting mirror and the display element is changed to continuously change a display position of the virtual image from a distant place to an adjacent position.

2. The head-up display apparatus according to claim 1, wherein in an optical distance of the optical element in the optical axis direction, an optical distance through which a light flux in an upper portion of the optical element passes is shorter than an optical distance through which a light flux in a lower portion of the optical element passes.

3. The head-up display apparatus according to claim 1, wherein the reflecting mirror is arranged on the optical path between the display element and a projection surface, and
wherein the optical element is arranged between the display element and the reflecting mirror.

4. The head-up display apparatus according to claim 1, wherein in the optical element, an average radius of curvature in a horizontal direction is different from an average radius of curvature in a vertical direction.

5. The head-up display apparatus according to claim 1, wherein the display element is arranged so as to be inclined with respect to an optical axis of the reflecting mirror.

6. The head-up display apparatus according to claim 1, wherein the light guide element has a reflecting surface configured to reflect the light from the light source inside the light guide element, and the reflecting surfaces are separated from each other.

7. A head-up display apparatus comprising:
a display element configured to display an image;
a light source apparatus configured to supply light to the display element; and
an optical system configured to display a virtual image on a basis of light from the display element,
wherein the light source apparatus includes a light guide element having a reflecting surface configured to adjust a divergent angle in a light emission direction toward the display element, the light guide element being configured to propagate light from a light source to the display element,
wherein the optical system includes an optical element and a reflecting mirror that are arranged on an optical path,
wherein the optical element has a surface shape configured to adjust a direction of a light flux made incident on the reflecting mirror in accordance with a ray emission angle from the display element,
wherein in accordance with radii of curvature of a vertical direction and a horizontal direction of a windshield, a horizontal cross-sectional shape of the reflecting mirror is a shape in which an average radius of curvature of an upper portion is smaller than an average radius of curvature of a lower portion with respect to the vertical direction so that magnification power becomes large in a state where the reflecting mirror is arranged on the optical path,
wherein an optical distance of the optical element in an optical axis direction is set so that an optical distance through which a light flux in an upper portion of the optical element passes becomes shorter than an optical distance through which a light flux in a lower portion of the optical element passes, whereby a virtual image obtained by being reflected by an upper portion of the windshield is formed farther than a virtual image obtained by being reflected by a lower portion of the windshield when viewed from a viewpoint position of a driver, and
wherein by changing a thickness of the optical element in the optical axis direction by the vertical direction, an optical distance between the reflecting mirror and the display element is changed to continuously change a display position of the virtual image from a distant place to an adjacent position.

8. The head-up display apparatus according to claim 7, wherein the reflecting mirror is arranged so that reflected light from the reflecting mirror is not blocked by the display element and the optical element.

9. The head-up display apparatus according to claim 7, wherein the display element is arranged so that a center of a display area of the display element is lower than a center of the reflecting mirror with respect to the vertical direction.

10. The head-up display apparatus according to claim 7, wherein the reflecting mirror is arranged on the optical path between the display element and a projection surface, and
wherein the optical element is arranged between the display element and the reflecting mirror.

11. The head-up display apparatus according to claim 7, wherein in the optical element, an average radius of curvature in a horizontal direction is different from an average radius of curvature in a vertical direction.

12. The head-up display apparatus according to claim 7, wherein the display element is arranged so as to be inclined with respect to an optical axis of the reflecting mirror.

13. The head-up display apparatus according to claim 7, wherein the light guide element has a reflecting surface configured to reflect the light from the light source inside the light guide element, and the reflecting surfaces are separated from each other.

* * * * *